US012433362B2

(12) United States Patent
Coyle et al.

(10) Patent No.: US 12,433,362 B2
(45) Date of Patent: Oct. 7, 2025

(54) ROTATION DAMPING HELMET

(71) Applicant: Brian Michael Coyle, Canyon, CA (US)

(72) Inventors: Brian Michael Coyle, Canyon, CA (US); Alys Larsen, Canyon, CA (US)

( * ) Notice: Subject to any disclaimer, the term of this patent is extended or adjusted under 35 U.S.C. 154(b) by 425 days.

(21) Appl. No.: 17/845,780

(22) Filed: Jun. 21, 2022

(65) Prior Publication Data

US 2022/0330645 A1 Oct. 20, 2022

Related U.S. Application Data

(63) Continuation of application No. 16/689,086, filed on Nov. 20, 2019, now Pat. No. 11,464,270.

(60) Provisional application No. 62/774,686, filed on Dec. 3, 2018.

(51) Int. Cl.

| | |
|---|---|
| ***A42B 3/06*** | (2006.01) |
| ***A42B 3/04*** | (2006.01) |
| ***A42B 3/12*** | (2006.01) |
| *F16F 15/03* | (2006.01) |

(52) U.S. Cl.

CPC ............ *A42B 3/064* (2013.01); *A42B 3/0486* (2013.01); *A42B 3/125* (2013.01); *F16F 15/03* (2013.01)

(58) Field of Classification Search

CPC ........ A42B 3/064; A42B 3/0486; A42B 3/125

See application file for complete search history.

(56) References Cited

U.S. PATENT DOCUMENTS

| | | | | |
|---|---|---|---|---|
| 5,564,421 A * | 10/1996 | Ehnholm | G01R 33/345 | 324/318 |
| 6,658,671 B1 | 12/2003 | Von Holst et al. | | |
| 7,930,771 B2 | 4/2011 | Depreitere | | |
| 9,032,558 B2 | 5/2015 | Leon | | |
| 9,999,263 B2 | 6/2018 | Loon | | |
| 10,034,511 B1 | 7/2018 | Bulat | | |
| 2004/0117896 A1 | 6/2004 | Madey et al. | | |
| 2006/0084857 A1* | 4/2006 | Massengill | G01R 33/28 | 600/407 |
| 2008/0282453 A1* | 11/2008 | Alstin | A41D 13/018 | 2/468 |
| 2013/0185837 A1* | 7/2013 | Phipps | B60R 19/18 | 2/2.5 |
| 2013/0276213 A1* | 10/2013 | Olsson | A42B 3/122 | 2/468 |

(Continued)

*Primary Examiner* — Khaled Annis

(57) ABSTRACT

The present invention is a helmet system that reduces concussions by damping rotational force transmitted to a helmet user. The helmet has an exterior shell and an internal body that moves independently from the exterior shell. At least one magnetic source on the exterior shell's interior has a dipole directed axially at the internal body. At least one magnetic source on the internal body has a dipole aligned with the same axis, directed at the exterior shell. In a resting state magnetic sources generate a weak magnetic field. When an impact rotates the exterior shell, it moves off the initial alignment and closer to the internal body. The previously aligned magnetic sources torque. The magnetic source on the internal body torques in the opposite direction of the rotation, as do all initially aligned magnetic sources impacted. Angular momentum is displaced, diffused, offset, damping rotational force transmitted to a helmet user.

8 Claims, 27 Drawing Sheets

(56) References Cited

U.S. PATENT DOCUMENTS

| | | | | |
|---|---|---|---|---|
| 2014/0000012 | A1* | 1/2014 | Mustapha | H01F 7/02 2/414 |
| 2014/0215693 | A1* | 8/2014 | O'Gara | A42B 3/069 2/410 |
| 2016/0113348 | A1* | 4/2016 | Twardowski, Jr. | F41H 5/0492 2/412 |
| 2016/0120238 | A1* | 5/2016 | Duncan | A63B 71/1291 2/462 |
| 2016/0143383 | A1* | 5/2016 | Allen | A42B 3/046 2/413 |
| 2016/0270472 | A1* | 9/2016 | Allen | A42B 3/122 |
| 2017/0143054 | A1* | 5/2017 | Yoon | A42B 3/32 |
| 2018/0110281 | A1* | 4/2018 | Morgan | A42C 2/00 |
| 2020/0085128 | A1* | 3/2020 | Coyle | A42B 3/064 |
| 2020/0139913 | A1* | 5/2020 | Wendelrup | A42B 3/122 |
| 2020/0154813 | A1* | 5/2020 | Wendelrup | A42B 3/00 |
| 2020/0154814 | A1* | 5/2020 | Wendelrup | A41D 13/018 |
| 2020/0170328 | A1* | 6/2020 | Yan | A42B 3/046 |

* cited by examiner

FIG. 14b
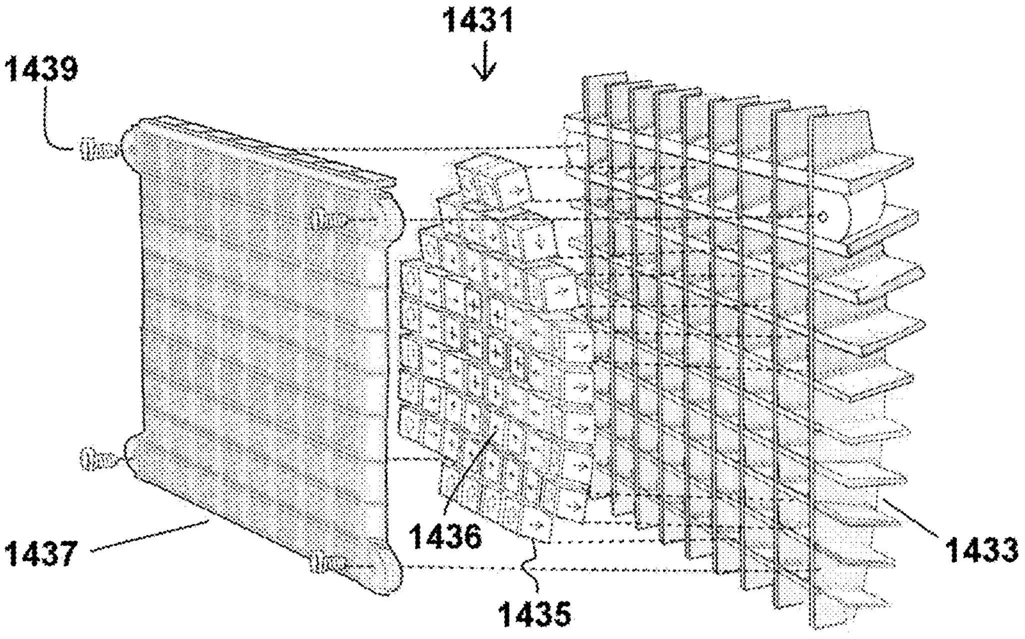
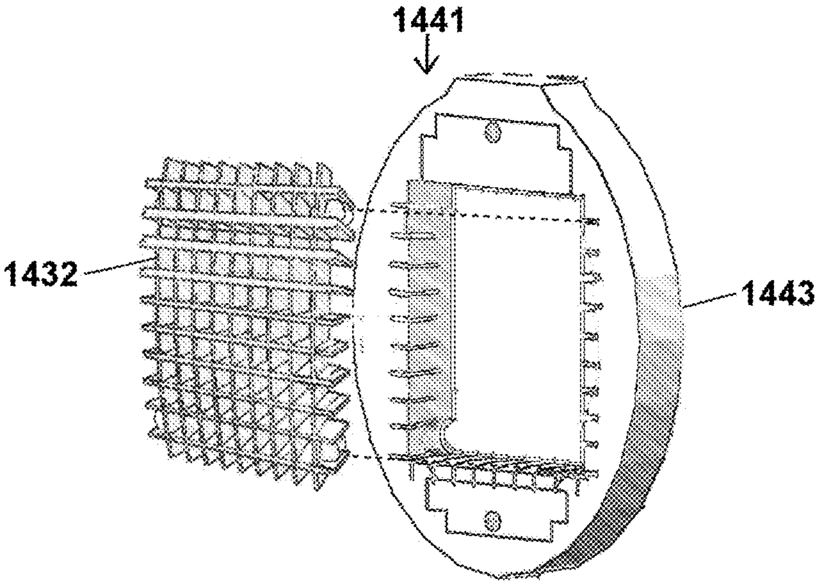

FIG. 23

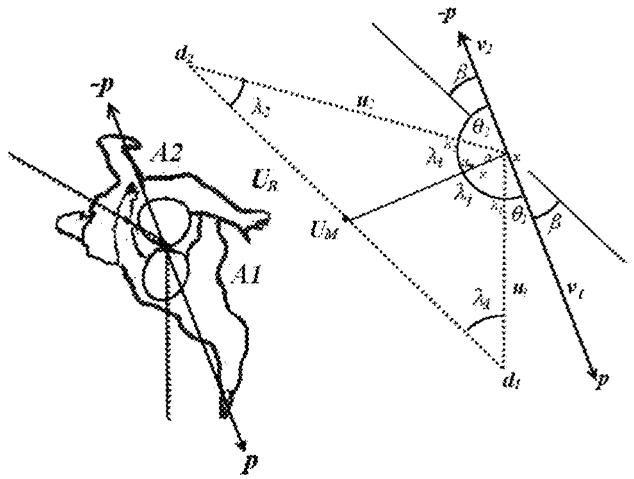

*A* is each player.

*a* is the angle between the two players heads and helmets at impact point x.

*h* is the center of mass of a players head and helmet.

*x* is the impact point.

*k* is the radius of rotation of both centers of mass.

*u* is each players velocity prior to collision.

*d* is the distance each player travels at *u* in a given time period.

*p* is the impact pulse direction of a player's motion after collision at *x*.

*v* is the velocity of impact pulse on *p*.

*θ* is the angle between the player's centers of mass and p $U_R$ = the vector from $d_1$ to $d_2$, the total closing speed of both players.

$U_R = \sqrt{d_1^2 + d_2^2}$ $U_M$ is the midpoint on $U_R$ $a_m$ bisects *a*.

*λ* is an internal angle on the $U_R$ triangle.

$\lambda i = a_m - h_2$
$\lambda j = h_1 - a_m$ $\theta_2 = 90 - \lambda i$
$\theta_1 = 90 - \lambda j$
$\theta_1 - \theta_2 = |\beta|$

*β* is the impact rotation that results in impact pulse *p*.

ROTATION DAMPING HELMET

PARENT TEST CASE

This application is a continuation of patent application Ser. No. 16/689,086, filed 20 Nov. 2019.

CROSS-REFERENCE TO RELATED APPLICATIONS

The present application claims benefit under 35 USC § 119(e) of U.S. Provisional Patent Application Ser. No. 62/774,686 filed on 3 Dec. 2018. The present application is based on and claims priority from this application, the disclosure of which is hereby expressly incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

The present invention relates to helmets for athletes, motorcycle riders, military personnel, and others who suffer head collisions. Most have hard shells, with shock absorbing elements or materials inside. The hard shell component resists breakage on impact, to maintain internal helmet structure, but does little to reduce the frequency and amplitude of impact shock.

Most helmet developments involve shock absorbing elements within the hard shell. When athletic players' heads collide, they decelerate, which causes G force increase. This is determined by the velocity of each head and helmet, their mass and scale, and angle and location of collision. Impact shock is attenuated by extending deceleration time. This typically involves deformation of passive material in the helmet, such as foam, as the head in the helmet compresses it. Newer helmet designs also use changes in element geometry, such as columns that bend to absorb energy. Altered internal segment stiffness, temporary or permanent, attenuates impact shock, head compression and linear acceleration.

Concussions, not skull bruising and fractures, are what threaten the very existence of American football as it is currently constituted. Concussions are also linked to the brain and psychological damage generated by explosion pressure waves and vehicle crashes. Concussions are induced by torque and rotation of the head, not compression and linear acceleration. Current helmets do not prevent concussions, because they aren't designed to. Most U.S. football helmet designs are not tested properly.

The U.S. military began G force impact research in the 1950s. Testing was needed to identify human capacities and limits. After human volunteers determined acceleration and deceleration thresholds, artificial mannequins were used, called crash test dummies, to gather evidence about human response to automobile impacts. Improved car safety correlates with data collection from these experiments. Safety engineers developed mannequins as passive robotic systems, which mimicked human centers of gravity and skeletal articulation, with dense data capture across the body. This led, for example, to careful analysis of side impacts, which induce neck flexion implicated in rapid head rotations. Evidence from tests led to side impact airbag development (Xu, Tao, 2018, 1.)

Since 2000, scientific research into football collisions has increased. Finite element analysis, combined with cadaver testing, found significant correlation between high-angular rotational velocity and intracerebral acceleration. Rotational acceleration may cause acute subdural haematoma (Kleiven, S., 2006, 2.)

Crash test dummies are now used in recreations of videotaped or common football impacts. Their metrics inform medical evaluation of athletes to determine if they have suffered a concussion. This is vital to increasing concussion awareness, and has helped delay reintroduction of potentially concussed athletes in games. Yet the most common assessment standards do not reference rotational forces. Recently, sensors applied to players in practice and in games detect head acceleration forces (Hanlon E. M. & Bir, C. A., 2012, 3.) Given vibration, friction, clothing, and general athletic environments, results exhibit great variation. Reports of G forces recorded by sensors in similar collisions may range up to an order of magnitude (Higgins, M. et al., 2007, 4.) Many sensor systems measure linear more easily than angular or rotational acceleration, leading some to erroneously conclude that head rotations are rare in football collisions (O'Connor, K. L. et al., 2017, 5.)

Automotive laboratory testing was aided by clear, measurable vehicle attributes: velocity, direction, mass, and impact zones. This gave safety engineers an exact framework within which to assess human physical response. The framework of contact sports is inherently more nebulous and difficult to specify, not just in the field, but in the lab. Player velocity is much lower than cars, so small differences and measurement error increase uncertainty. Body parts have different velocities, with different impact contributions. The mass that governs impact deceleration is also difficult delimit in a player, since only part of an upright body is involved in horizontal collisions. An entire car's mass is implicated in an auto crash. In U.S. football, collision mass may include part of, or the entirety of, the head and helmet, or include the neck, neck and shoulders, or perhaps even more of a lunging body.

Although an automobile crash test can execute precise impact scenarios, forensic examinations of real-world car crashes also have large uncertainties. This is similar to assessing collision response from players wearing sensors during games. Laboratory auto crash tests are influenced by real world examples, and forensic interpretation of car crashes are informed by lab test data. But engineered safety elements in cars primarily address laboratory crash test results (Isaksson-Hellman & Norin, 2005, 6.)

At the most basic level, helmet impact tests need to focus on real-world head responses, not helmet oriented ones. Automobile safety advanced because researchers studied the response of humans in accidents, not cars. The U.S. football helmet industry, on the other hand, tests helmets by dropping heavy weights on them, or dropping the helmet on hard surfaces. This tests whether the helmet breaks, not the head's response (Hirad & Mahon, 2019, 7.) If cars were evaluated like football helmets, they would be still be rigid boxes, rather than have strategically crumpling engine compartments that protect occupants. Airbags might not be developed.

Professional boxing discovered concussions are induced by torque and rotation of the head, not compression of the skull, over 80 years ago. Boxers are told to build strong neck muscles to dampen potential rotation, an appropriate, if inadequate, adaptation (Collins, C. L., et al., 2014, 8.)

Punch someone straight on, and they may feel pain and suffer skeletal fractures, but won't pass out. Animal and even bird brains absorb linear force without concussing, as studies of woodpeckers show. Hit someone at an angle on the jaw, or on the side of the head, and it will cause the head to rotate rapidly, which induces brain movement that leads to concussive knockouts. In 1943 Holbourn determined that shearing forces in deep brain areas resulted from violent rotational movements. Rotations can stretch and tear neurons and even blood vessels. That causes concussions and, if severe enough, loss of consciousness (Holbourn, A. H. S., 1943, 9.)

In the last decade, finite element analysis has been used to model high-angular rotational velocity and intracerebral acceleration, and can be used for helmet testing (Teng, T-L, et al., 2012, 10.)

This invention will reduce head trauma, by dampening head rotation acceleration, when a football player's head, a motorcycle rider's head, a hockey goalie's head, a military service member's head, or another person's head, receives an impact. It involves technology whose evidence for action is based on abundant laboratory and real-world evidence, as well as technology deployed in over 100 million automobiles. It advances upon technology used in bicycle helmets. It's novel, non-obvious, and necessary.

Bicycling and snowsport helmets may now contain a slip plane between a helmet's shell and deformable layer, to reduce rotational acceleration.

U.S. Pat. No. 6,658,671 to Van Holst and Halldin (P1) assigned to a Swedish company, Multi-directional Impact Protection Systems, is a slip plane concept. A slip plane is intended to reduce rotational energy momentarily for the critical first milliseconds of an impact. The patent describes using low friction oil, teflon, or microspheres to create a sliding layer inside a helmet shell, so the shell may rotate independently of the head. This may be used in situations where helmet movement is permissible during ordinary activity, because slip planes are poorly coupled to degree of impact. Thus such a helmet may move from incidental motions, which prevents application to contact sports.

U.S. Pat. No. 7,930,771 to Depreitere, B., et al. (P2) is for a bicycle helmet which has an inner layer in contact with a user's head, an intermediate layer anisotropic foam material, and external shell. The foams cited expand orthogonally to the direction of impact, spreading rotatation force more than ordinary foam cells do. As deployed in many cycling helmets, they do not readily return to pre-impact condition, and can be used only until a single impact occurs. Helmet impacts are relatively rare in cycling, and even a slight reduction in sheer forces is useful. In contact sports, with frequent helmet collisions, single-use padding material is not useful. Nor, given the severe impacts experienced by football players, motorcycle riders, military personnel, and others, is the anisotropic foam sufficient.

U.S. Pat. App. 2004/0117896 A1 by Madey and Bottlang (P3) describes a helmet with an elastic layer (possibly a gel) inserted between at least two other layer components, to allow rotational displacement of the exterior shell independent of inner layers. The capacity of the system to decouple inner layer response is limited, however. The inner layer has only limited rotational displacement.

U.S. Pat. No. 9,032,558 to Leon (P4) describes a helmet system with a hard shell that moves independently from a head cap attached to a user's head, because of a separate impact-absorbing liner. The liner is made of small, vertical foam columns that bend in response to impact, thereby reducing angular forces transmitted to the head cap. Because the foam columns must be tightly packed and rigid to preserve impact absorption capacity, their bending capacity is limited. This allows rotational acceleration energy to continue to turn the head and bend the neck.

Slip planes are inherently passive systems, which diffuse energy through friction reduction, to deny its transmission between outer and inner layers. Passive systems do not generate energy to compensate for rotational acceleration. Given the high G forces in football collisions, they are limited in preventing concussions.

Both U.S. Pat. No. 9,999,263 to Yoon (P5) and U.S. Pat. No. 10,034,511 to Bulat (P6) utilized magnets disposed close to the exterior shell of a helmet. These are intended to reduce the force of two players' heads colliding, because the magnetic polarity directed outwards on both helmets is the same. That causes magnetic repulsion between meeting helmets. However, neither invention considers the unpredictable torque that could occur on one or both helmets, which could increase risk of concussions. Having players all wear helmets with identical polarity also requires excessive coordination between teams, players, companies, and associations.

Active shock attenuation mechanisms would require delivering an orthogonal force to helmet components prior to the helmet's rotational forces transmitted to the wearer's head, and perhaps neck. Collisions are governed by nonlinear geometry over fractions of a second. Active structural reconfigurations have not been conceived that can be adequately executed in such a brief time.

Therefore, a need exists for an athletic helmet that can actively dampen helmet rotations within less than 100 milliseconds. When rotational forces are extreme, such a helmet should have a fail safe option. The present invention substantially fulfills these needs, by using methods that actively dampen rotational forces. It uses the concept of magnetic fields in a way that is completely different from prior art and conventional concepts, to produce a helmet that can reduce the risk of concussions.

SUMMARY OF THE INVENTION

It is an object of the present invention to provide a helmet that dampen rotational forces transmitted to the head of the helmet wearer, including those rotations above threshold "rotations per minute" (rpm) that predictably cause concussions, by providing an equipment system that overcomes the limitations of prior art. The system, which will be described subsequently in detail, provides an exterior shell with impact resistant material and structures, and an internal body that directly surrounds the user's head. The impact absorbing material and structures attached to the helmet shell's inner surface are configured with one or more magnets assembled to direct a magnetic field of a given polarity axially inwards. The exterior shell pitches, rolls, and yaws independently of the internal body. One or more magnets are arrayed on the internal body configured to direct a magnetic field with the same polarity axially outwards. A gap between the internal body and exterior shell prevents magnetic field forces from interaction during ordinary conditions, maintained by space-orientors that may stretch, bend, or compress from impact forces.

When the user's helmet collides with a moving or fixed object or wave force, the user's head drives the internal body towards the exterior shell, and the object's mass or wave force drives the exterior shell towards the internal body. Magnetic repulsion decelerates these motions, attenuating impact. Magnetic repulsion causes torque, the basis of electrical motors. Because of the configuration of exterior shell and internal body magnetic fields, the magnet arrays on the internal body torque in a vector direction that is orthogonal to the sheer or rotational motion of the magnet assemblies on the exterior shell. The magnet array's torque is an active force that pushes the internal body. If the collision induces the helmet to twist down and left, the magnet array pushes the internal body up and right, to partially or wholly cancel the collision induced rotation force transmitted to the head. The internal body physically communicates with the user's head.

Another object of the invention is that the internal body provides a surface conducive to measuring the exterior shell's directional velocity. The internal body, or another surface, can be configured with a Hall effects sensor, or other similar magnetic field detection component. This sensor detects the direction and velocity of passing magnetic fields of the magnets attached to the internal surface of the exterior shell. The sensor communicates with a controller that detects rpm levels, and identifies thresholds of head rotations predicted to have a significant risk of severe concussion. The controller then triggers gas, fluid, or another agent to rapidly fill an airbag or other immobilizing structure at the base of the user's neck, close to it, surrounding the user's head, or otherwise disposed, which instantly expands and prevents the user's head from dangerously accelerating.

In one embodiment flexible projections between the internal body and exterior shell are tube-like, and contain a column of magnets. These magnets are oriented to emit a magnetic pole to either side of the flexible projection. The flexible projections are configured to maximize repulsive magnetic field generation if the exterior shell rotates in any direction, thereby dampening rotation acceleration.

There has thus been outlined, rather broadly, the more important features of the invention in order that the detailed description thereof that follows may be better understood and in order that the present contribution to the art may be better appreciated. It responds to concussion-causing collision events with active forces that counteract head rotations.

The invention is not limited in its application to the details of construction and arrangements of the component set forth in the descriptions herein or illustrated in the drawings. The invention is capable of other embodiments.

BRIEF DESCRIPTION OF THE DRAWINGS

Some embodiments of the present invention are illustrated as an example and are not limited by the figures of the accompanying drawings, in which like references may indicate similar elements and in which:

FIGS. 14A, 14B, and 14C illustrate the componential assembly of a magnetic field pad.

FIG. 23 illustrates the collision forces generated between football players.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. In describing the invention, it will be understood that a number of techniques and steps are disclosed. Each of these has individual benefit and each can also be used in conjunction with one or more, or in some cases all, of the other disclosed techniques.

The present disclosure is to be considered as an exemplification of the invention, and is not intended to limit the invention to the specific embodiments illustrated by the figures or description below. In particular, the disclosure describes helmets used in U.S. football. The same problems can arise in other endeavors where helmets are used. These include ice hockey, particularly the position of goalie; motorcycle riding; and military use.

Figure 24A:
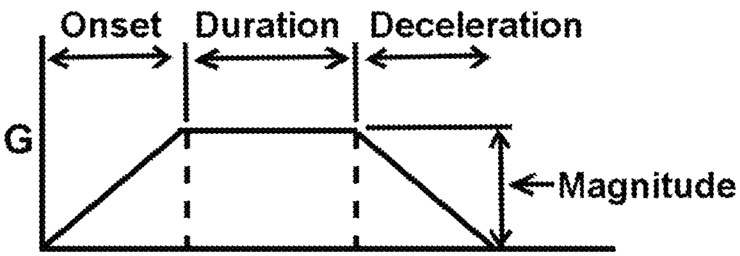
FIG. 24A is a graph of the phases in a collision event.

During collisions, humans experience heightened G-force stimulus. In FIG. 24A, this is divided into three phases: onset, duration, and deceleration. Increased G force magnitude causes greater human body impacts, but this depends on time-periods. A fast acceleration rate of G-forces during onset prevents body adaptation. If onset acceleration is damped, the human body can better mitigate the impact. Increasing the time over which maximum G-forces occur increases human impacts, unless the time extension lowers maximum magnitude. Deceleration is critical in determining concussion effects. The more rapid the deceleration, the more strain is caused on the brain.

Figure 24B:
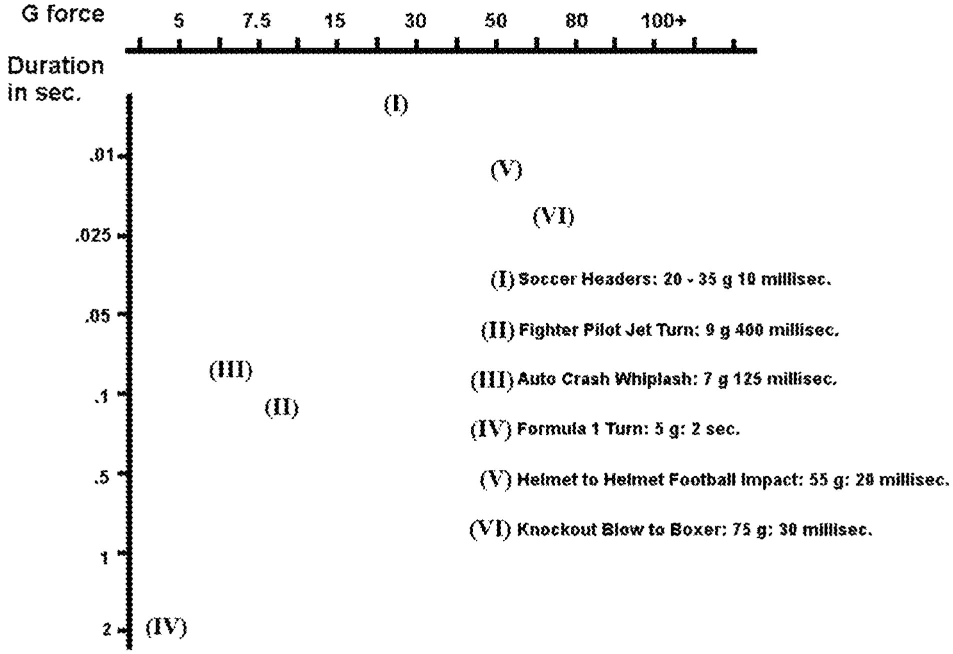
FIG. 24B is a graph of g-force impacts caused by different events.

A helmet should extend the time-periods of onset and deceleration, and reduce the magnitude of G-forces during the maximum impact duration. FIG. 24B shows typical G-force and maximum duration times for different collision events. A fighter pilot experiences a far lower G-force impact than many contact sport athletes, but the pilot event lasts an order of magnitude longer. Pilots need special training to adapt to this, because the effect is severe.

Heading the ball in soccer can cause as much G-force acceleration in the player's head as a football collision. Heading is a very brief duration event. This may make it less damaging, but onset and deceleration times are poorly defined. Unlike football, hockey goalie impacts are due to projectiles, from the hockey puck. These can generate direct linear acceleration impacts that cause contusions. The velocity of slap shots by professional players is sufficient to cause rotational accelerations that can cause concussions. Because projectiles impact a small area, they can damage helmet structure.

Evidence from soldiers exposed to bomb blasts shows that pressure waves cause the head to accelerate, linearly and rotationally, and also that pressure waves can directly pass into the cranium, and compress the brain. The importance of rotational acceleration in blast induced traumatic brain injury is uncertain. Some claim the short pulse of a blast wave may limit the head's overall movement. However studies find the head's motion after the blast can have a significant effect on pathology.

American football players at the high school, college, and professional level often receive head blows of 20 G's. Researchers attach sensors to helmets, in player mouth guards, on head bands, or other places to measure impact forces. Sensor placements vary results, and measurement error of 20% is common. Still, it seems most in-game or in-practice college and professional American football players experience multiple 30 to 60 G blows during a season. Impacts up to 100 G's may occur at least once a game to someone. Researchers using sensors have detected some over 150 G.

Collision force will cause bodily injury depending on where it's applied and by what. Player bodies are in a vertical position when running, but collide with each other on a horizontal plane. Only part of the upright body is directly involved. Although players weigh 250 or 300 pounds, the part that collides weighs less. Some parts of the human body absorb impact better than others. Knees are notoriously vulnerable. Heads have a fraction of a player's total mass, but are very vulnerable to impact consequences.

In boxing, concussions are caused by blows to the head from a first and associated arm mass. Boxing knock-outs are significant concussive events which involve elevated G-force impacts over an extended duration. In football, players can use their hands, arms, or even torsos to deliver head blows. But most concussions occur from helmet to helmet collisions.

The masses involved include the head, which weighs between 10 and 12 pounds, plus a five pound helmet, about 16 pounds total. If a head-on, 180° collision between players' heads wearing helmets closes at 28 mph (14 mph each) and generates 20 G's, it delivers about 320 pounds of force to each player's head. At 50 G's, each experiences 800 pounds of force. At 100 G's, each experiences 1600 pounds of force. Players usually collide at less than 180°. As objects collide at lower angles, impact energy magnitude is reduced, but more energy is used for rotational acceleration. Professional football players can run 14 mph. Their impact kinematics can be modeled based on convergence between 0° to 180°, but common head impacts are between ±45° and ±135°.

In FIG. 23 a collision is modeled, illustrated, and with equations defined, between two players, one running at 8 mph, the other 11.5 mph. Only in open-field running do players reach top speed. Collision angle in this example is 114.5°. Their combined closing speed is about 14 mph, not 19.5 mph as if they collided head-on, a 30% reduction. This results in a coefficient of restitution of about 0.3, residual energy for post-collision movement.

Finite element analysis of automobile impacts at different angles finds that maximum G-force magnitude experienced by occupants is reduced by about 15% at a 120° contact angle, compared to head-on 180°. This was mostly the result of longer deceleration times due to reduced closing speed due to <180° impact. However <180° angles induce greater occupant rotations.

If each players' helmet has a 10 inch radius, a collision that generates 50 G's linearly can generate 63 centrifugal G's and 1006 centrifugal pounds of force. This tracks the linear acceleration calculation, except that different radii alter centrifugal force greatly. Angular acceleration is measured in units of radians per second squared, in this case around 49 rad/$s^2$.

Helmets are designed to reduce linear acceleration, not angular acceleration. Linear acceleration is reduced through deformation of the exterior shell, and a padding and liner that spread the force throughout the helmet. Rapid acceleration of the head occurs when liners "bottom out."

Lewis et al. measured peak G intraorally, cranially, and in helmet padding. During impact with a soccer ball traveling at 39.3 mph, 49.3 G's were recorded at the helmet and 7.7 intraorally. Without a helmet, the intraoral measurement mean peak acceleration was 19.2 G, therefore the helmet reduced the intraoral impact by 60% (Lewis L. M. et al., 2001, 11.)

Figure 24C:
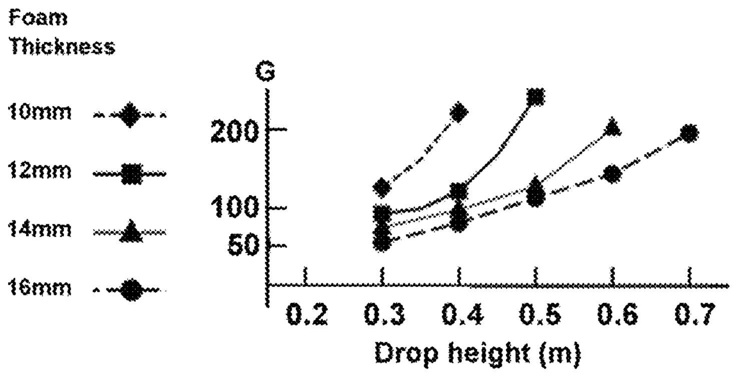
FIG. 24C is a graph of different foam thickness effects on impact results.

When a 50 G impact force is reduced by half, around 25 G impact force remains to potentially accelerate and rotate the head. In FIG. 24C, foam compression was tested using different velocities of mass impact. At 0.3 meter height, the ball travels 5.42 mph. Different foam thickness allows different remaining G-forces. A 16 mm thick foam reduces over twice the impact compared to 10 mm foam. At 7 mph, the 16 mm and 14 mm foam reduce remaining G-force over twice the amount of 12 mm foam (Park, J. M. et al., 2016, 12.)

FIG. 24C shows that, for each padding thickness, a velocity is reached where they "bottom out" and G-forces skyrocket. At 7.67 mph, the 16 mm foam "bottoms out". Most professional football helmets have around 19 mm foam padding. Extrapolating from FIG. 24C, a 19 mm padding may "bottom out" around 8 mph. Yet even a 5.42 mph, all padding thicknesses transmits significant G-force—close to 50 G for 16 mm. A helmet shell reduces the velocity transmitted to internal padding, perhaps by 2 to 3 mph, but that leaves a lot of energy for angular rotations and head-snapping movements.

The more distant the force vector is from the head's center of gravity, the less linear force damping occurs. Hence the most elevated angular acceleration can occur if a player's helmet is hit tangentially across one side. In this event, limited foam deceleration may occur, because the impact does not compress the helmet. But if force is transmitted to angular momentum, the helmeted head will spin at high rotations per minute (rpm).

Peak G force measurement alone is a poor measure to predict brain injury. All the kinematic parameters of head motion must be considered. The direction (linear and rotational in three dimensions), acceleration, duration, magnitude, and deceleration of the motion are all important parameters, as shown in FIG. 24A.

The head injury criterion (HIC), which is used by helmet manufacturers and researchers, and is a federally mandated motor vehicle safety standard, only evaluates linear accelerations of the head. Rotational inertial forces are thought to be the underlying mechanism for most severe brain injuries. Rapid rotational or deceleration force can stretch and tear neurons, leading to petechial hemorrhage and/or edema at the gray-white matter junction, at the corpus callosum, and in the brainstem.

The internet has many sites claiming a knock-out punch causes the head to spin over 40,000 rpm. Given a large male head is 50 inches around, a point on it's equator travels 2,000,000 inches, or 31.6 miles in a minute at that rate, a clip of 1,894 mph. The velocity of a bullet leaving a rifle muzzle is about 3,803 mph. Do punches really send the head spinning half as fast as a bullet?

No. The ultimate tensile strength of muscle, before it tears apart, is about 493 megapascal (MPa). This force can generate 185 G, and would make a head (and helmet) with a 10 in. (254 mm) radius spin at 806 rpm. Although different muscles, people, and conditions would vary these results, 40,000 rpm is 49.6 times too fast for the human body.

Internet sites confuse rad/s and rad/$s^2$. Studies show that athletic movements that generate maximum muscle/tendon angular velocities reach about 80 rad/s velocity—not acceleration. Rad/$s^2$ measures acceleration per second. One study found rugby players who suffer concussions experience mean rotational accelerations of about 4,000 rad/$s^2$. Accelerations occur over 10 milliseconds. A point on the 50 inch circumference head's equator (about an 8 in. radius), may be impelled to move up to 14 mph for 50 milliseconds. It rotates 1.54 rads, or 88.2°. That's almost a quarter turn of the head. 4,000 rad/$s^2$, in terms of 8 inch radius heads and helmets colliding, is around 300 rpm, and 20 G's. But rpm is a velocity measure, not acceleration. Since the duration of head rotation is very important, rpm is a useful metric, but is rarely calculated in football studies.

Figure 2:
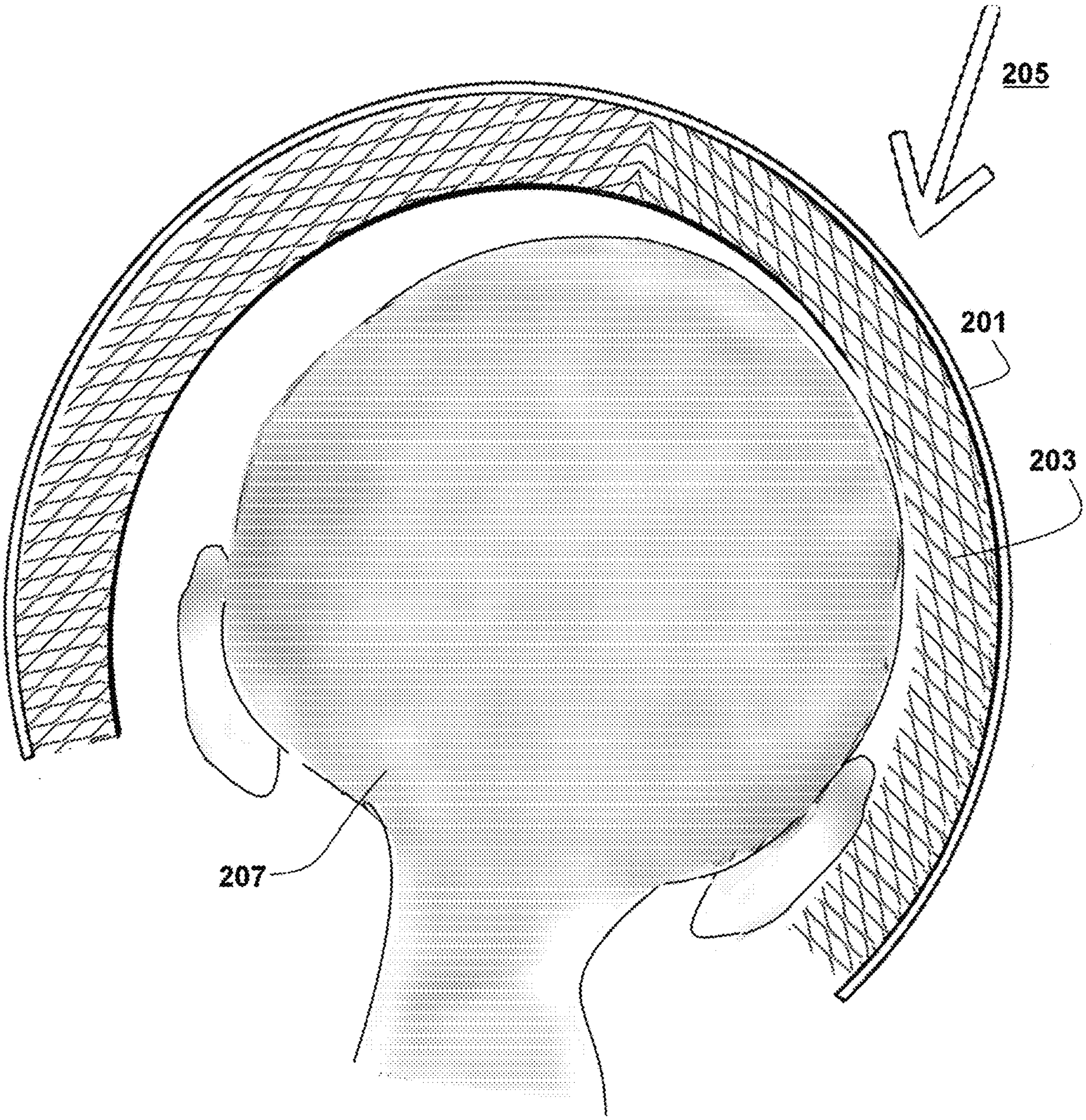
FIG. 2 PRIOR ART
FIG. 2 depicts a schematic view of contact sport helmet current art, illustrating how a collision with an opponent's mass induces the user's head and neck to twist.

FIG. 2 illustrates a conventional, state-of-current-art football helmet, which limits impact through a shell 201 and padding 203. A tangential impact 205 causes shell and padding to both rotate, and transmit the rotation force to head 207. If this rotation is sufficiently fast, extensive, and abrupt, a concussion may occur. There is no active process in the helmet to dampen the rotation forces.

In many serious collisions helmet foam will passively reduce angular acceleration G's. The residual rotational force produces angular acceleration that causes 10 to 30 G's, which is conceptually similar to around 100 to 500 pounds of force for typical adult players. This invention compensates by generating the same amount of force in the opposite direction, through torque applied to an internal layer to compensate for the helmet shell's rotation. It also has a fail safe system to prevent extreme rotations. It uses magnetic forces of equivalent strength.

Magnetic repulsion is concentrated at areas where inner and outer magnets oppose. Orienting several smaller magnets together so that their polarities are offset can maximize a magnetic field in one direction, and minimize it in the opposite direction. General parameters of magnetic field strength are well-established. Halbach arrays and their modifications increase magnetic strength, in one direction, by up to five times.

Figure 1A:
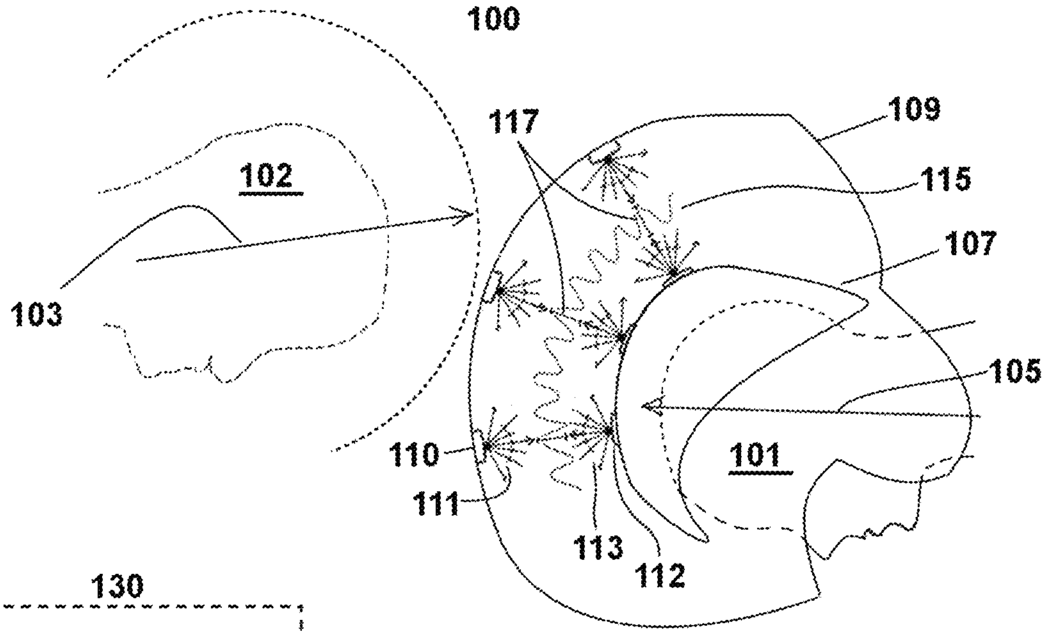
FIG. 1A depicts a schematic view of the invention in action.

FIG. 1A displays a resting state 100 of a Rotation Damping Helmet (RDH), prior to contact. Illustrated is a player 101 wearing the RDH, an opponent 102, the direction of movement 103 of the opponent, and the RDH player's direction of movement 105. The RDH is composed of an inner cap 107 and a shell 109, the shell 109 having an appearance of a type commonly used in American football. The RDH configuration shown provides a magnetic array 110 on the inside of the shell 109, which generates a magnetic field 111, and also a magnetic array 112 on the outside of the cap 107 which generates a magnetic field 113. The magnetic arrays are spaced a sufficient distance apart so that in the resting state 100 a zone of no-interaction (of magnetic fields) 115 exists in between them. The magnetic arrays may be of identical construction or have different different constructions. Each of the magnetic fields comprises a central dipole surrounded by field lines, and in a resting state the aligned dipoles of shell magnetic fields 111 and cap magnetic fields 113 align, to form a Quasi-Symmetrical Axis (QSA) 117.

Figure 1B:
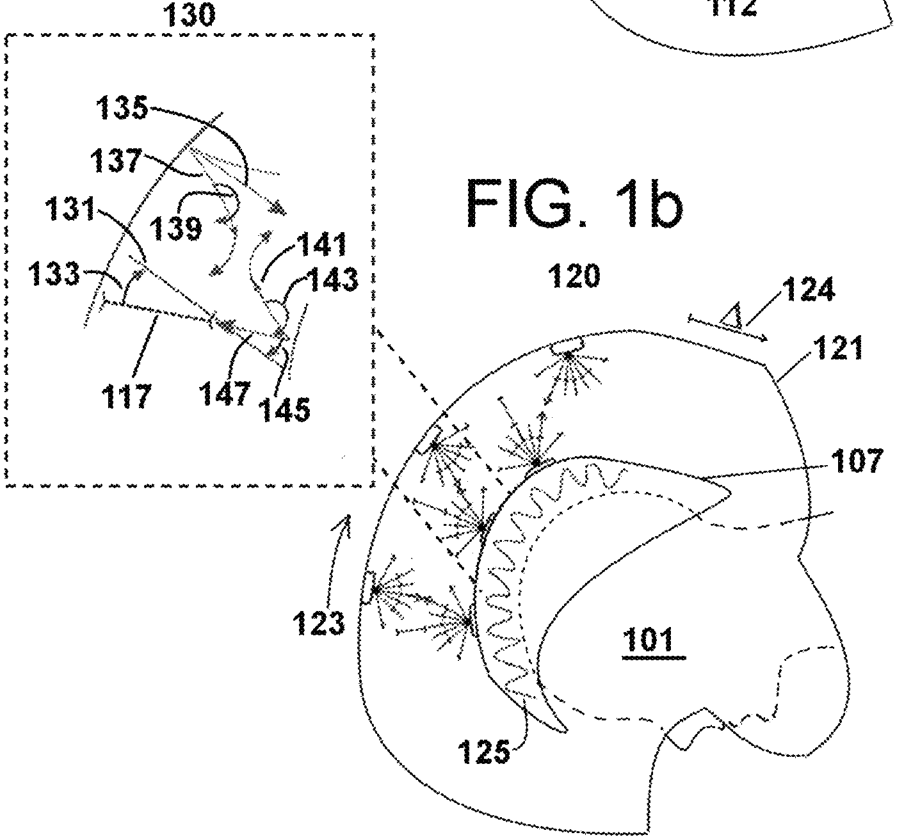
FIG. 1B depicts a schematic view of the invention's response to a collision.

FIG. 1B shows a response state 120 of the RDH, post-contact. The shell 121 is rotated on the head of the RDH player 101. The inner cap 107 is not rotated. The external rotation direction 123 and the degree of rotation 124 generate movement force ω that may be transmitted to a player's body.

The RDH mechanisms that prevent this transmission are shown in the enlarged section 130, which illustrate the generation of torque. Torque is defined mathematically as the rate of change of angular momentum of an object. This is often considered the rate of change of angular momentum of an object due to the object's changing shape. But in the case of a helmet, the object doesn't change shape; instead, it absorbs external force from a collision. It has a magnitude $\tau = mB \sin \vartheta$, with $\vartheta$ is the angle between m and B. The cap magnetic field dipole 147 is m, and the shell magnetic field dipole is B 135. The torque τ tends to align m with B. It has its maximum value when ϑ is 90°, and it is zero when the dipoles are aligned, forming the QSA 117. Rotating a magnetic dipole requires energy, which is provided by force ω defined by 123 and 124.

Shell rotation causes the shell magnetic dipole 135 to rotate relative to the cap magnetic dipole 147. This generates a magnetic flux field B' that twists m, causing torque. New axis 131 defines the angle 133 between m and B' after movement force ω is applied to the shell. Shell rotation field line 137 defines the rotation of B, the rotation vector 139 deviated from 135 towards the cap rotation field line 141. This causes a repulsion between magnet fields. Torque vector 143 is the torque produced by cap rotation field line 141. Torque motion 145 is equivalent to angle 133. If a typical professional football player collision applies 250 Newtons of force perpendicular to the helmet radius, which is 9 cm, and head plus helmet weigh 7.5 kg, the angular acceleration=22.5 N m/0.030375 kg $m^2$=740.74 rad/$s^2$. This is sufficient to cause injury. The magnetic repulsion torque response dampens or cancels force in a linear fashion.

Figure 3A:
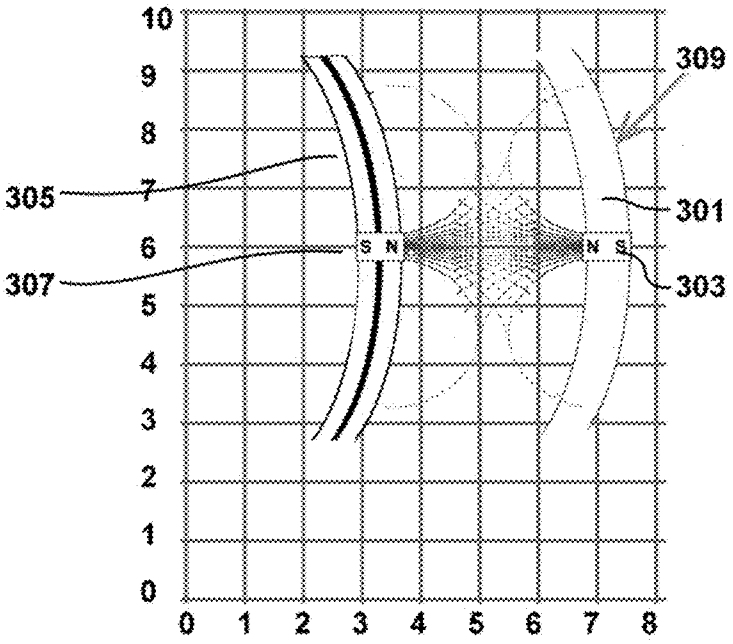
FIG. 3A shows the magnetic fields of helmet shell and internal body under ordinary conditions.

FIG. 3A shows a shell 301 with magnet 303 embedded, pointing north inwards, and centered at coordinate 7.25X, 6Y. Internal body 305 with a magnet 307 embedded, pointing north outwards is centered at 3.25X,6Y. The magnetic fields are at a distance where mutual interaction is minimal. In a preferred embodiment this distance may be between 10 and 30 mm, or 10 and 50 mm, or any other distance that permits the magnets to quickly interact from their non-interactive state. A tangential impact vector 309 has both an X and Y direction component in this 2-dimensional representation.

Figure 3B:
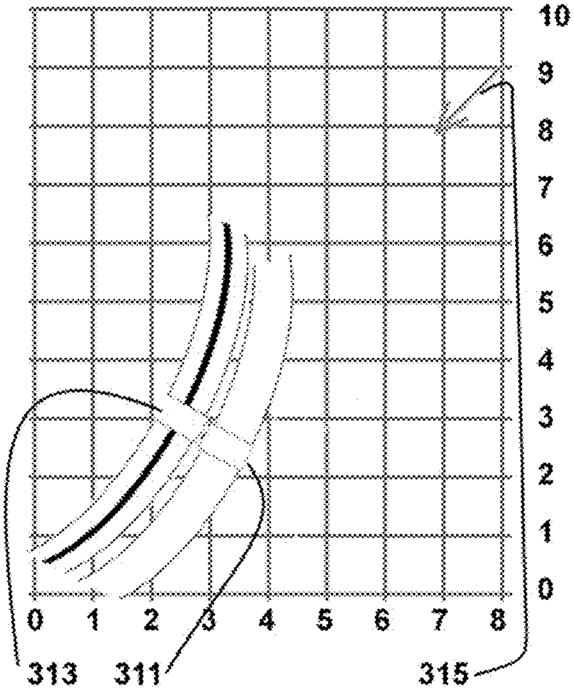
FIG. 3B shows how a shell and internal body without magnetic fields respond to a tangential collision.

FIG. 3B shows a shell 311, centered at 3.25X,3.5Y, and internal body 313, centered at 2.6X,3Y, without embedded magnets. Under tangential impact force 315, without magnetic repulsion and torque, the exterior shell is driven inwards by the opposing player, and the internal body is driven outwards by the user's head. Both twist together under the tangential impact, causing the user's head to twist as well. The liner has moved 30° around a circle, perhaps over 10,000 rad/ms.

Figure 3C:
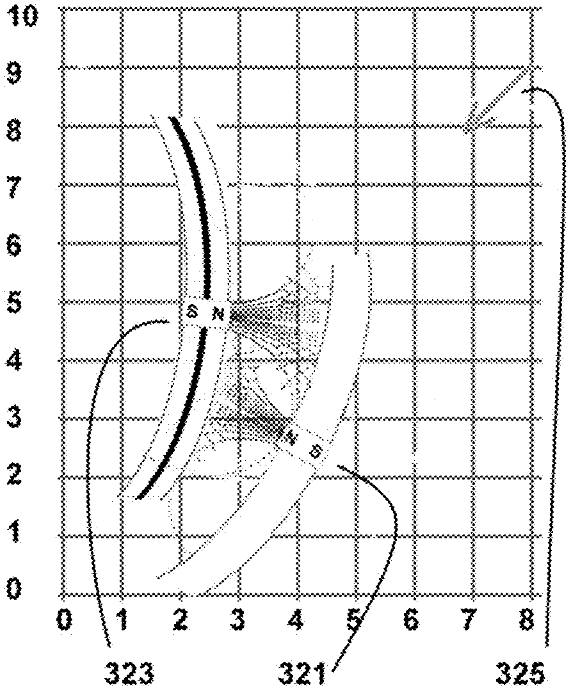
FIG. 3C shows how the magnetic fields of the current invention cause the internal body to respond to the shell's motion during a tangential collision.

FIG. 3C shows this invention's result after a tangential impact. As the tangent vector 325 is composed of movement in the Y-axis and X-axis (in two dimensions), the shell 321 may move down the Y-axis with limited magnetic field interaction, but is restricted from moving in the X-axis due to liner 323's repulsive magnetic field. Inner liner 323 moves towards exterior shell 321 so magnetic fields interact. Exterior shell 321's Y-axis movement induces inner liner 323 to torque in the opposite Y-axis direction.

The result is that inner liner 323 compensates for the tangential impact force, damping the rotation of the head, which inner liner 323 contacts. Some linear acceleration occurs.

Figure 4A:
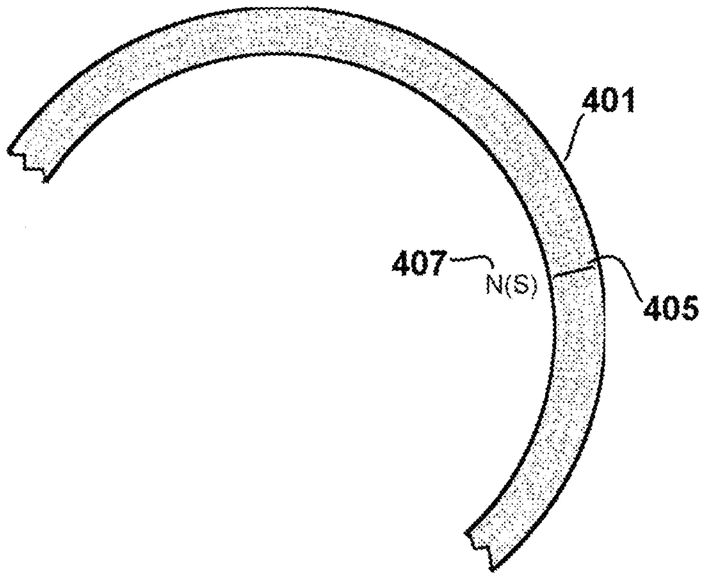
FIG. 4A illustrates the basic configuration of shell with a magnet with an inward polarity.
Figure 4B:
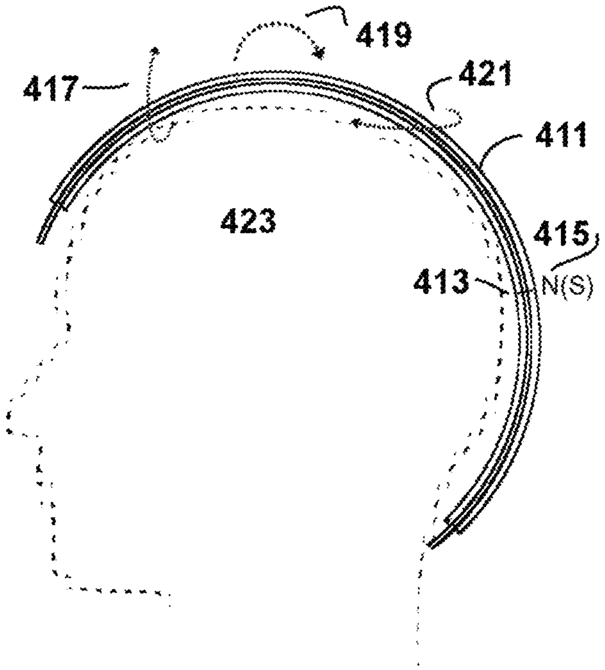
FIG. 4B illustrates the basic configuration of an internal body with a magnet with the same polarity facing out.

FIG. 4A illustrates the basic configuration of a helmet shell 401 with its padding 403, as used in this invention, in or on which a magnet or magnet assembly 405 is located, with a specific polarity (such as north, N) 407 directed inwards. FIG. 4B illustrates the basic configuration of an internal body 411 in the invention, which can be connected by material to the exterior shell, but which can move independently of the exterior shell. It has a magnet array 413 located in or on it, opposite the exterior shell magnet, with the same specific polarity (such as N) 415 directed outwards. Internal body 411 can rotate in three dimensions, roll 417, pitch 419, and yaw 421. Internal body 411 is in direct contact with head 423.

Figure 5A:
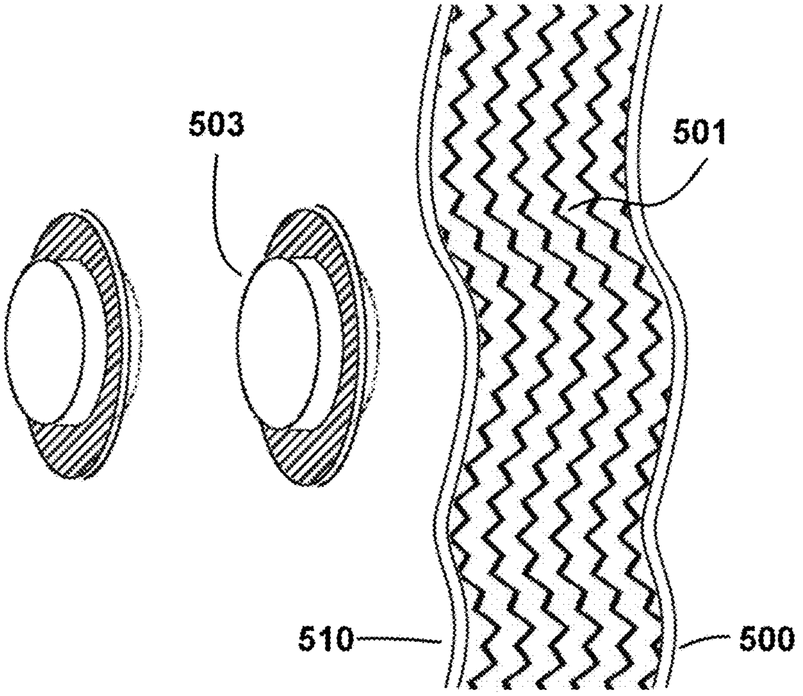
FIG. 5A illustrates the shell material with exterior shell magnets oriented inward.
Figure 5B:
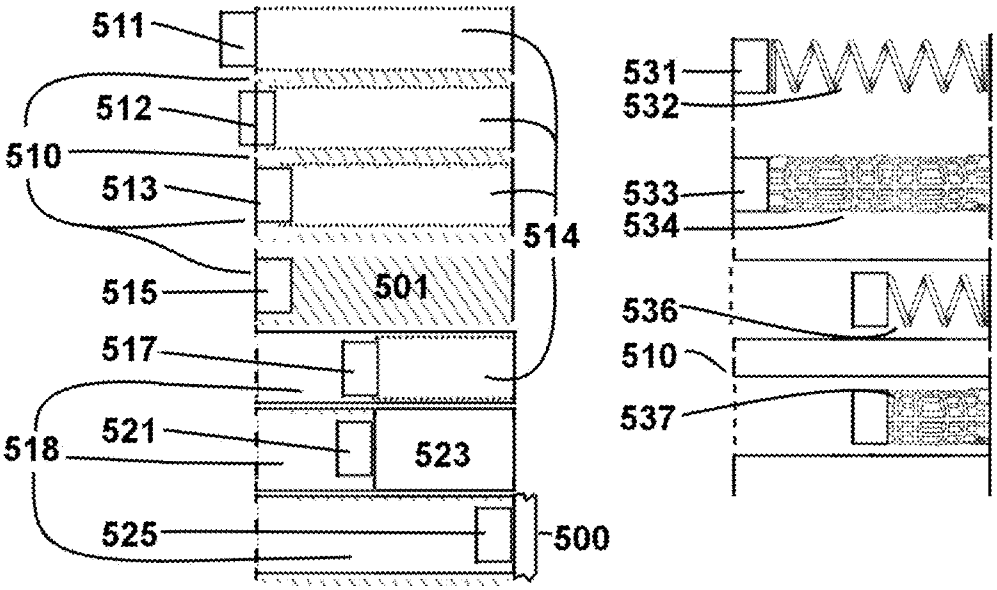
FIG. 5B depicts different configurations of magnets in the exterior layer.

FIG. 5A illustrates the shell impact resistance material 501 between outer shell 500 and inner face 510, with exterior shell magnets 503 with magnetic flux oriented inward. FIG. 5B depicts different configurations of magnets in the exterior shell. Magnet 511 extends beyond inner face 510 of the exterior layer. Magnet 512 extends partially beyond inner face 510. Magnet 513 is flush with inner face 510. Magnets 511, 512, and 513 are positioned in or before tubes, plugs, tracks, paths, containers or other enclosures 514 that are flexible and impact resistant. Magnet 515 is positioned without a special enclosure, in outer padding 501. Magnet 517 is recessed behind an edge commensurate with inner face 510, but may or may be enclosed by such a face. Magnet 517 has an open space 518 before it, and enclosure 514 to its rear. Magnet 521 is recessed behind an edge commensurate with inner face 510, with an open space 518 before it, and a solid surface 523 to its rear. Magnet 525 is recessed behind an edge commensurate with inner face 510, with an open space 518 before it, attached close to the outside of the shell 500.

Magnet 531 is connected to a spring or other durable material 532 that can be compressed but returns to its former shape when released. Magnet 533 is connected to a flexible framework, lattice, grid, or other patterned structure 534 that absorbs impact forces. It should be understood that many alternative positioning systems can be configured that are not displayed, such as a series of collapsible sub-units, pellets, or spindles. Magnet 536 illustrates an impact absorption system that is configured to a magnet recessed behind an edge commensurate with inner face 510, but may or may be enclosed by such a face. Magnet 537 illustrates a compression material system that is configured for a magnet behind an edge commensurate with inner face 510, but may or may be enclosed by such a face. FIG. 5B merely demonstrates that a range of alternative magnet positioning systems may be considered, and is by no means exhaustive.

Figure 6A:
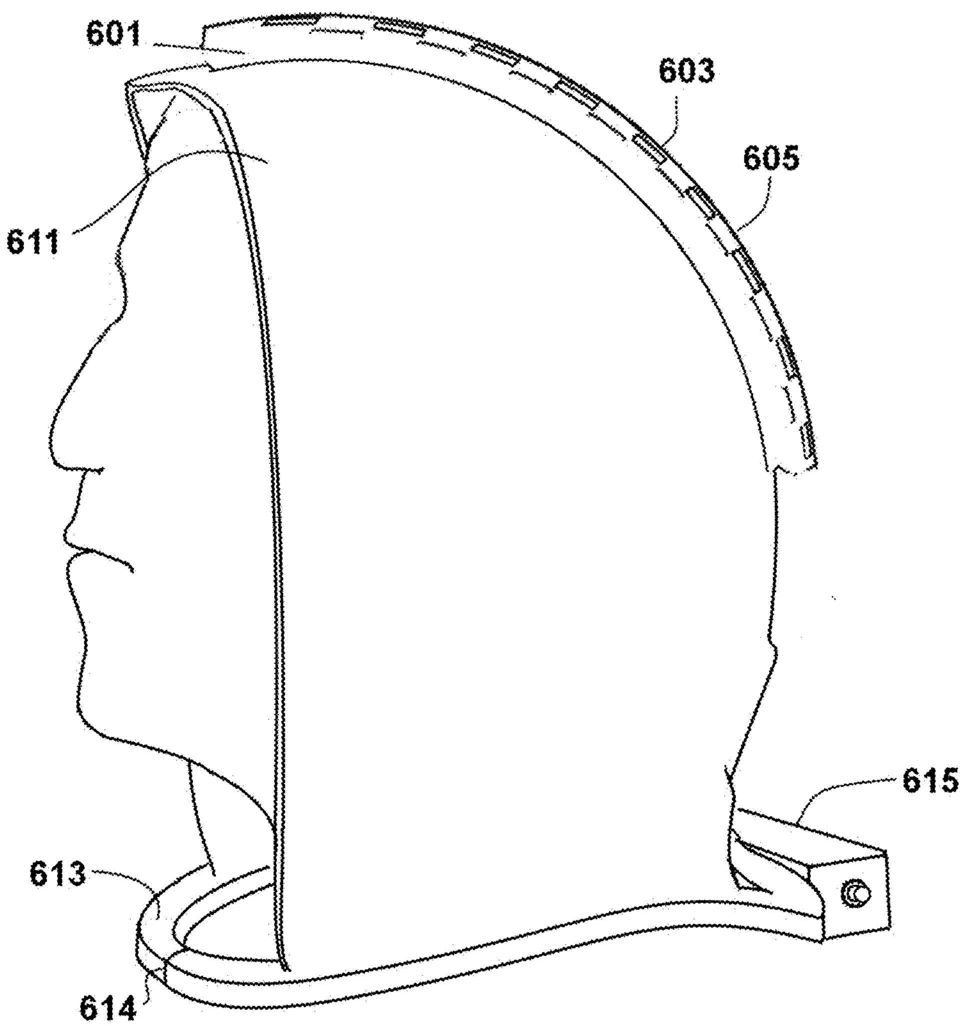
FIG. 6A illustrates the internal body with magnets and sensors configured, and the uninflated air bag and the inflator container worn by a user.

FIG. 6A illustrates the internal body 601 with magnets 603 and orientation sensors 605 configured. Magnets 603 are positioned to torque orthogonally to the exterior shell magnetic fields when distance between them shrinks, as during a collision. Orientation sensors 605, in a preferred embodiment, detect the external shell magnetic fields movements relative to the internal body. Because the internal body torques in the opposite direction of the external shell's torque, orientation sensors 605 can instantly detect the external shell's acceleration in at least three orthogonal directions. Orientation sensors 605 may be magnetic field sensors, such as Hall effects sensors, or other sensors such as position, velocity, accelerometer, or gyroscopic devices.

Between internal body 601 and the user's head, airbag head component 611 (which may be a shield or hood) is positioned to surround the head. Airbag head component 611 serves as an uninflated airbag bladder, made from conventional reinforced fabrics that are sufficiently strong to withstand collision-induced forces without rupture. Materials that may serve this purpose include fiber/plastic blends, rubberized fabrics, and flexible composites. At the base of airbag head component 611 is the uninflated airbag neck component 613, which snaps together at the front 614. Gas generators or compressed gas is incorporated into inflator container 615, which may comprise tablet formulations and other compositions known in the art. Hybrid and pressurized gas inflators may also be employed in a known manner. The uninflated airbag components may be worn separately from the internal body, or may be attached to the internal body in some way.

Figure 6B:
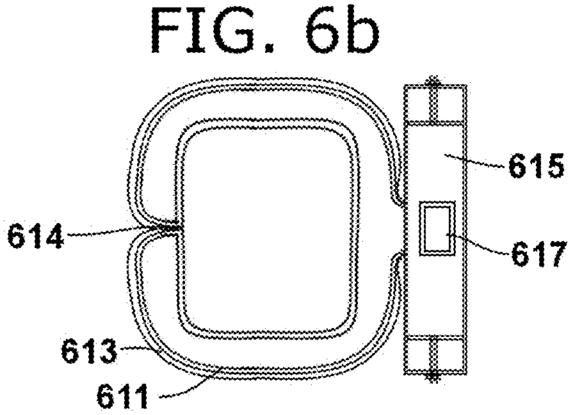
FIG. 6B shows the air bag and inflator container schema.

FIG. 6B is a schematic drawing of airbag components 611 and 613, inflator container 615, and controller 617. Ruggidized programmable inflator controller 617 can distinguish rotations likely to induce serious concussions from other player collision events. It interprets electromagnetic inputs from the linked orientation sensors. Controller 617 is configured to receive data from at least one orientation sensor, and is programmed to process the data to: detect at least one of a state and a transition of the helmet shell, identify ordinary parameters for at least one state and transition, and determine whether shell motion is outside a predetermined, continuously determined, or otherwise determined acceleration, velocity, or force transition threshold, wherein controller 617 is configured to identify, in real-time, the inception of a concussion-inducing rotation.

When controller 617 identifies concussive rotation inception, it deploys airbag components 611 and 613. When deployed, airbag components 611 and 613 are of a size and shape to envelope at least a portion of the player's head, or may be large enough to surround and protect a significant amount of the player's head. The inflated airbag decelerates rotation of the head by deflating.

Controller 617 is also programmed to deploy airbag components 611 and 613 when a very severe collision occurs without rotation. This is detected due to the rapid reduction of space between internal body and exterior layer magnets, which overcomes repulsive forces. Though not a source of concussion, this is a source of danger to the head, under an extreme impact that causes padding to fail completely. This may never occur in American football, but could occur in helmets used by motorcyclists or in military use.

Instead of a hood or shield, the invention can be configured with a yoke that comprises the uninflated airbag material, and rests on the player's shoulder pads or other similar components.

Figure 7:
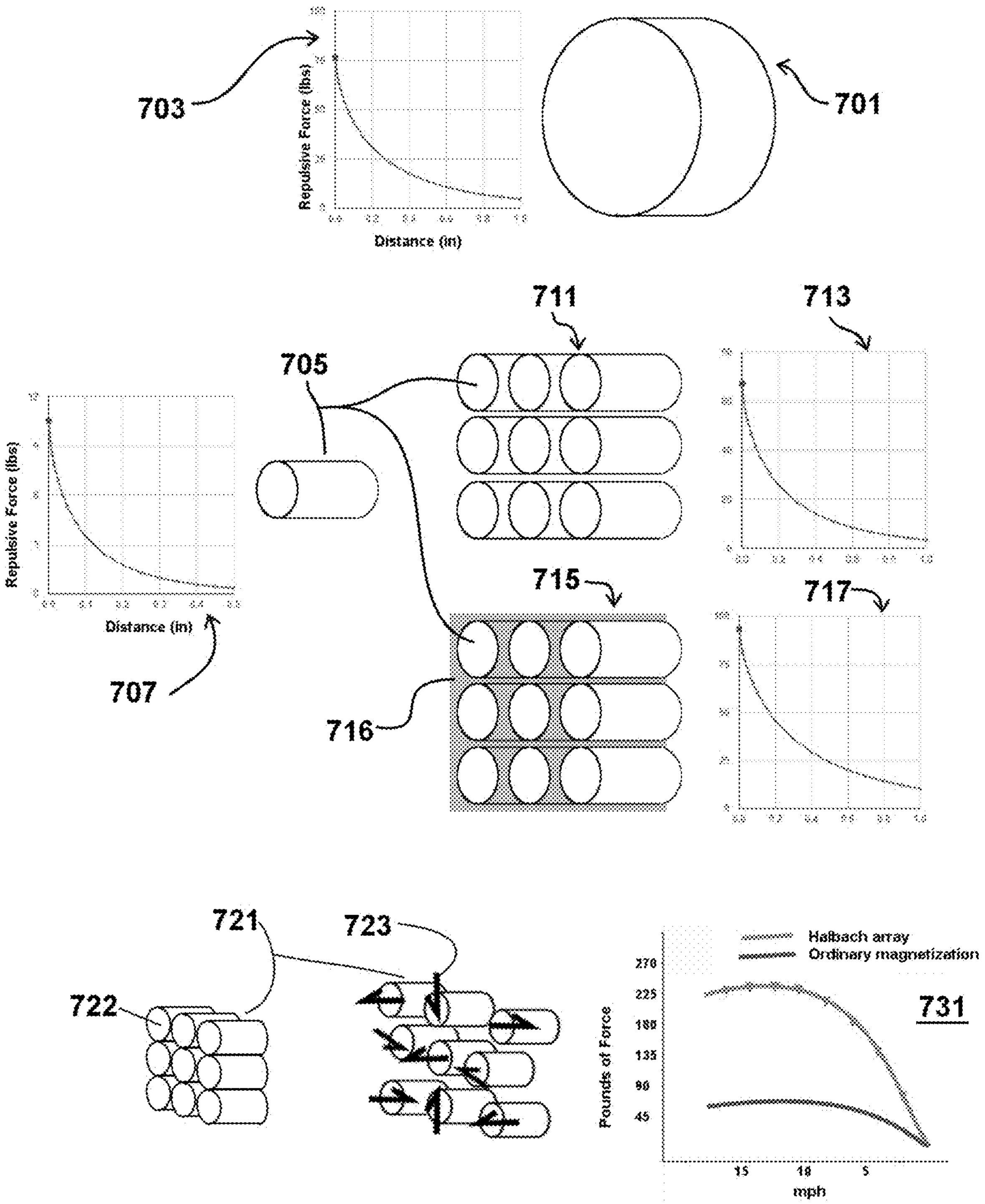
FIG. 7 illustrates different magnet and magnet arrays, including a modified Halbach array.\

FIG. 7 illustrates different magnet and magnet arrays. In an embodiment, the invention's magnets may comprise rare earth compositions, or conventional magnetic materials (e.g., ferromagnetic), or an electromagnet. The specific magnets illustrated in FIG. 7 can be obtained from K&J Magnetics Inc., of Pipersville, Pa., and are made of rare-earth compositions (e.g., Neodymium Iron Boron—NdFeB), grade N52. Cylinder magnet 701, shown at actual size, has a 1.25" diameter and 0.5" width. According to graph 703, from K&J's laboratory, it takes 75 pounds of force to make magnet 701 touch another magnetic surface with the same polarity. To approach within 0.1" requires almost 50 pounds of force. A helmet needs a foam thickness that "bottoms out"—becomes maximally compressed—at a thickness >0.5", if magnet 701 was positioned in it. A similar type of inner liner magnet may be thinner and less powerful.

While magnet 701 has enough strength, and has a footprint scaled to satisfactorily match a serious impact force from a helmet collision, it presents a large metal surface that could provoke safety concerns in a helmet wearer. It also bears considerable weight, and can be damaged by impacts. Because magnets like 701 are what people consider a conventional magnet, and because they seem unrealistic elements in a helmet, they may typically prevent consideration of magnets in helmets.

Magnet 705, shown at actual size, has a ⅜" diameter and 0.5" width. According to graph 707, from K&J's laboratory, it takes 10.52 pounds of force to make magnet 705 touch another magnetic surface with the same polarity. To approach within 0.1" takes 3.48 pounds of force. Magnet array 711 combines nine 705 magnets. Graph 713 shows it takes 66 pounds of force to make array 711 touch another magnetic surface, about 70% of the sum of nine individual magnet 705 strengths.

Magnet array 715 combines nine 705 magnets, encased in a magnetically propagating material 716, such as iron. This brings array 715's total magnet strength to the equivalent of the sum of nine individual magnet 705 strengths, as shown in graph 717, according to which it takes 94 pounds of force to make array 715 touch another magnetic surface. However such an encasement creates a large metal footprint that pose similar problems to magnet 701.

Also, magnet 701, and magnet arrays 711 and 715, emit magnetic fields equally in both directions, and do not focus magnetic fields. It is possible, using numerous smaller magnets, or specially manufactured single magnets, to direct most or all of the magnetic field to only one side, and no magnetic field to the other side. This significantly increases magnetic field strength per total magnet volume, and eliminates magnetic fields where they are unwanted, such as towards a player's head. Magnet arrays so configured are called Halbach arrays. Increased magnetic field efficiency permits total magnet volumes to be reduced. It is also possible to narrow a magnetic field, and ensure it's strength homogeneity, both of which enhance the action necessary to induce the helmet's internal body to torque the opposite direction from a twisting helmet shell.

Modified Halbach array 721 arranges nine magnets 722 that are smaller and have lower magnetic flux than magnets 705. Halbach arrays may turn each magnet 90° from each other, in a way that maximizes magnetic field on one side and mostly cancels it out on the other. Arrows 723 on each magnet show the direction of north pole. Graph 731 illustrates braking force generated by ordinary magnetic arrays and Halbach arrays, showing the maximum braking force that each array applies (as eddy fields) at different speeds. The magnetic braking force is, in part, proportional to relative velocity of the brake, particularly at low speeds, hence falls off below 8 mph. However it is also proportional to the array's magnetic field strength, which shows that Halbach arrays generate three or four times more repulsive force that ordinary magnet arrays in braking tests.

Halbach arrays demonstrate their most superior performance advantage when engaged in magnetic repulsion. When tested for magnetic attraction, Halbach arrays may reach twice the strength, on one side, of an ordinary array. Yet Halbach arrays may be three to five times stronger than an ordinary magnet array when tested for repulsion.

Figure 8:
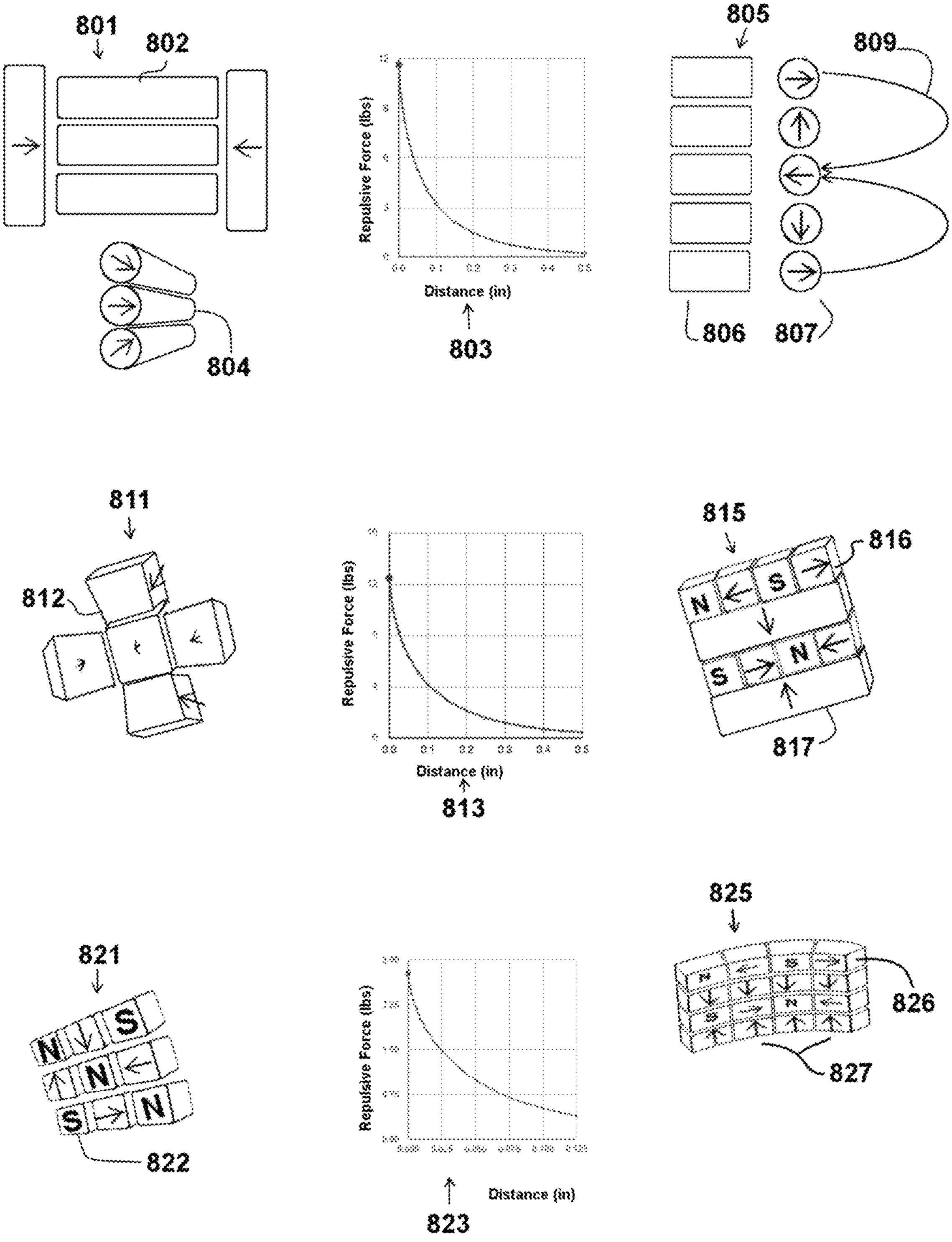
FIG. 8 illustrates different magnet arrays that achieve increased magnetic field repulsive power.

FIG. 8 illustrates different magnet arrays that achieve elevated magnetic field repulsive power in small volumes. In an embodiment, the invention's magnets may comprise rare earth compositions, or conventional magnetic materials (e.g., ferromagnetic), or an electro-magnet. The specific magnets illustrated in FIG. 8 can be obtained from K&J Magnetics Inc., of Pipersville, Pa., and are made of rare-earth compositions (e.g., Neodymium Iron Boron—NdFeB), grade N52.

Magnet array 801 contains five magnets 802, shown at actual size, that each have a 0.25" diameter and 1.0" length. Magnets 802 are diametrically charged, with their north and south poles on the long, curved sides. According to graph 803, from K&J's laboratory, it takes 11.61 pounds of force to make magnet 802 touch another magnetic surface with the same polarity. To approach within 0.1" requires 3.21 pounds of force. Note that the same size magnet that is axially charged, with poles on the flat ends, has less than half this field strength. Thus, using diametrically charged magnets can be more efficient than axially charged ones, if the magnet is longer than wide. Magnet array 801 rotates each magnet 802 inward, except for the magnet in the center. The three central magnets 804 are shown from a side view, with rotation directions marked. This is not a Halbach array, but a method of magnetic focusing to enhance total field strength, which in this example may exceed 70 to 90 pounds of force in a conic area in front of array 801, rather than 58, the sum of the five magnets independently.

Magnet array 805 contains five magnets 806, each with a 0.25" diameter and 0.5" length, in a modified Halbach array. Each of these magnets 806 is half the length of the previous magnets 802. Each rod is rotated alternately through 90°, shown in schema 807. The resulting plane of the magnet field 809 is on one side of the array. Because of the added field strength of a Halbach array, a similar amount of magnetic repulsion can be obtained with array 805 as with array 801 even though magnets 806 are half the length of magnets 802.

Magnet array 811 contains five magnets 812, each a cube with ⅜" faces. According to graph 813, from K&J's laboratory, it takes 12.46 pounds of force to make magnet 812 touch another magnetic surface with the same polarity. To approach within 0.1" requires 4.18 pounds of force. Magnet array 811 rotates each magnet 812 inward, except for the magnet in the center. This is not a Halbach array, but a method of magnetic focusing to enhance total field strength, which in this example may reach 75-95 pounds of force, instead of the 62 pounds of each magnet summed independently.

Modified Halbach array 815 contains eight magnets 816, each a cube with 0.25" faces, and two magnets 817, each a diametrically charge bar 0.25" to the side, and 1" long. Each of the smaller magnets 816 is rotated in a manner to maximize the magnetic flux on the front side of the array, and minimize it on the back side. The second and fourth rows of this magnetic array rotate towards the middle. Because this Halbach array exploits diametrical charging, it is stronger than typical Halbach arrays. This magnet array will be at least 1.7 times more efficient, in terms of generated force, than array 811. Despite smaller size, more magnets are used, so the footprint of array 815 is similar to array 811. Independently, magnets 816 and 817 sum to 84 pounds of force. The total combined magnetic field force of array 815, due to the Halbach configuration and diametrical charging, is at least 140 pounds of force. In regard to repulsive force, that will be higher.

Modified Halbach array 821 contains nine magnets 822, each a polygon with two 0.25" faces and one 0.5" face. It takes 6.26 pounds of force to make magnet 822 touch another magnetic surface with the same polarity. To approach within 0.1" requires 2.84 pounds of force. The Halbach modification increases array 821's magnetic flux at least 1.8 times on its front, north facing side, for a total of 100 pounds of force.

Modified Halbach array 825 contains magnets 826 that are 0.125 on edge, and 0.25 in depth and width. They are diametrically magnified through the edge. According to graph 823, from K&J's laboratory, it takes 2.77 pounds of force to make magnet 826 touch another magnetic surface with the same polarity. To approach within 0.1" requires 0.44 pounds of force. Array 825 has the same arrangement as modified Halbach array 815, except that the second and fourth row are made up of four magnets 827 of type 826. This is necessary to adjust their combined shape, which curves in. The curve focuses the magnetic field to further boost the total magnetic field force directly in front of array 825, where the magnetic field may be over 110 pounds of force.

Hence by combining Halbach effects with diametric magnetization and curvilinear arrangement the magnet field force of a group of magnets can be doubled. This allows the magnet footprint to shrink even further, in a single layered array that may be incorporated in an internal body of the invention.

Increased strength of magnet force is important. So is the homogeneity and focus of a magnetic field.

Figure 9A:
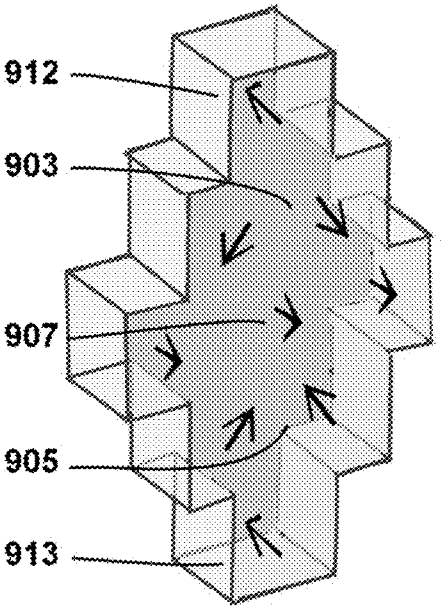
FIGS. 9A, 9B, 9C, and 9D illustrate different magnet arrays that achieve increased magnetic field power that is homogeneous and focused.

FIG. 9A shows a modified Halbach magnet array that emphasizes a focused, precise magnetic field. It includes mid-upper magnets 903 and mid-lower magnets 905 that are diagonally polarized. This increases the magnetic field force, perhaps by 2.5. However, it may be necessary to focus that field for maximum performance. Arrows point to the direction of polarity. To achieve a uniform, constant, and relatively narrowly defined magnetic field, array 9A uses a variation. Mid-upper magnets 903 and mid-lower magnets 905 confine the magnetic field, while center magnet 907 acts as a path for magnetic flux, returned via end magnets 912 and 913. If the width of center magnet 907 is extended as presented in FIG. 9A, the confining effect may be weakened, but the magnetic field of 907 becomes more uniform. The magnetic field force is reduced to perhaps 2 times ordinary magnet surface flux. The combination of diagonally polarized mid-upper and mid lower magnets, and extended length center magnet, results is a powerful, focused magnetic field.

Figure 9B:
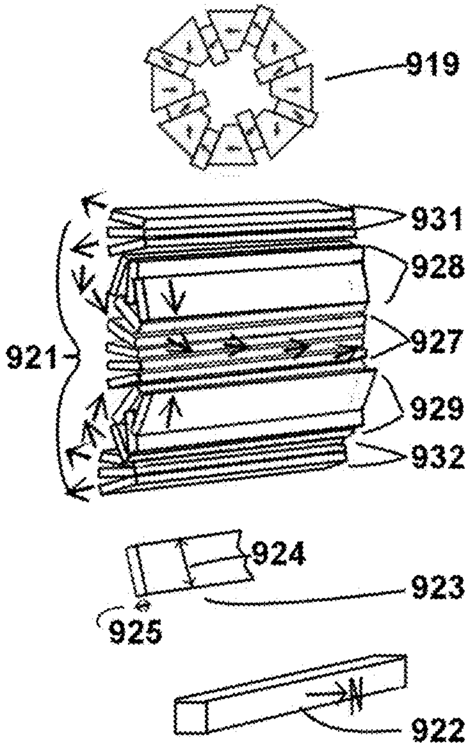

FIG. 9B shows a modified Halbach magnet array that maximizes magnetic force given magnet mass, in a scalable configuration. This embodiment has 18 rectangular magnets 921 of dimensional shape shown in 923, with width 924 that is four times thickness 925. To generate maximum field strength, width and thickness should be identical with magnetization across the width, as in example 922. The array in FIG. 9B configures central magnets 927, upper-mid magnets 928, and lower-mid magnets 929, to achieve an effect similar to 922 while constraining total magnet volume and "feathering" the magnetic polarity orientations. Arrows point to the direction of polarity. "Feathering" is similar to "shimming" strategies used in Halbach rings, such as 919. "Shimming" positions additional permanent magnets within a basic cylindrical Halbach array to homogenize the magnetic field. This ensures a more uniform field projection, important when pairing helmet shell magnets and internal body magnets.

Reducing the angle between adjacent magnet polarity orientations generates a more homogeneous field force. "Feathering" can accomplish the same goal as "shimming," while slicing a square magnet into as many thin slices as are "feathered" maximizes magnetic field energy. Upper magnets 931 and lower magnets 932 are also "feathered" and combine force, but in this embodiment have three instead of four magnet members. The array in FIG. 9B will have a two to four times greater magnetic field that comparable magnetic volumes with standard orientation. It can be scaled according to need. The long and concave architecture of this assembly has been found to be about 50% stronger than a more cubic shaped Halbach array.

FIGS. 9A and 9B illustrate magnet arrays that may be used either in the internal body or the exterior shell.

Figure 9C:
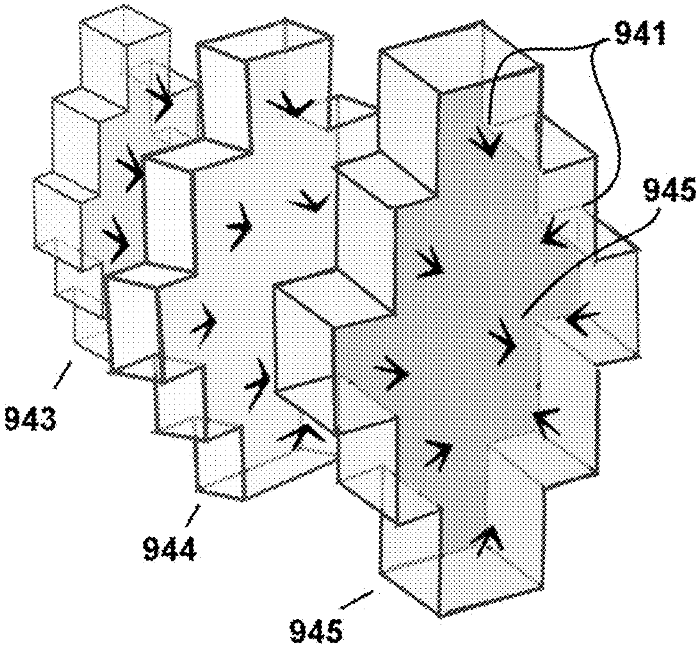

In the embodiment illustrated in FIG. 9C, a 3-layer "pyramid" shape is used. The most effective elements contributing to narrow force field are the ones closest to the center of it. Therefore having multiple levels of centralized magnet elements generates an effectively shaped force. The 3 layers 943, 944, and 945, are shown apart to better visualize the magnetization orientations. The magnetization orientations 941 "fan in", to extend and focus the magnetic field. On magnet 945 only the central magnet 947 faces directly forward. This may be true on layer 944, but the small size of layer 943 makes "fanning in" less necessary.

Figure 9D:
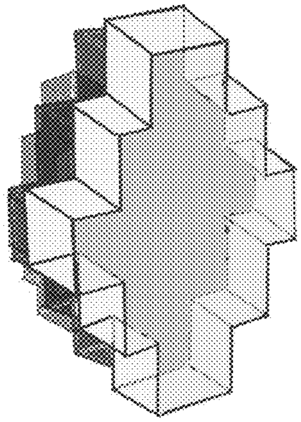

FIG. 9D illustrates the overall formation of the pyramid array. In a study of magnetic field arrays designed to direct therapeutic magnetized particles to deep tissue locations of the human brain, a pyramidal arrangement of magnets was 5 times more powerful, in terms of precisely oriented magnetic field force, than an equivalent volume of a few large magnets. That allows pyramidal magnet configurations to be as much as 5 times smaller than the magnetic volume that might normally be needed, while concentrating magnetic field force on a narrow, precise region. The magnet assemblies used close to the exterior shell may comprise three dimensional structures such as FIG. 9D.

Figure 10:
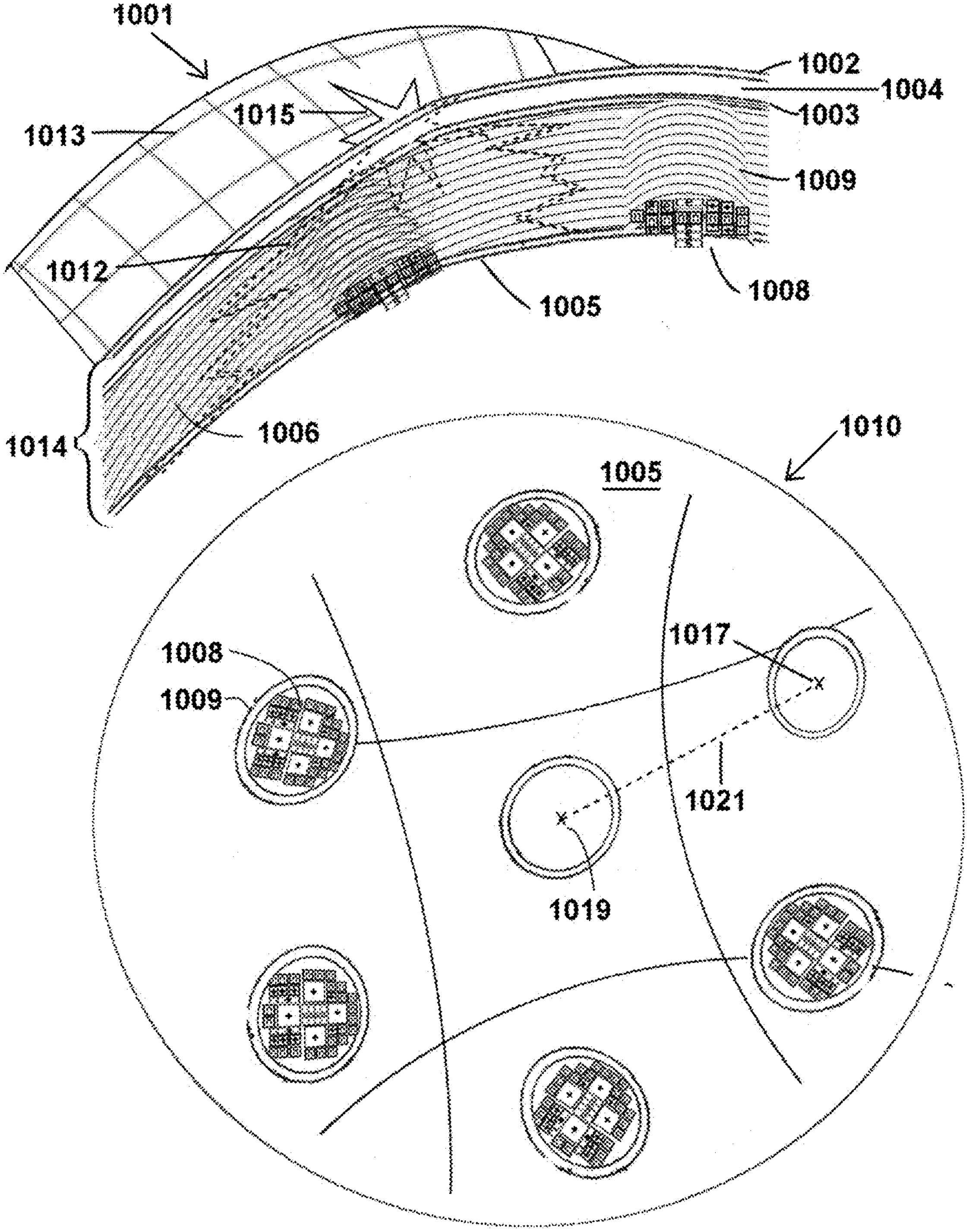
FIG. 10 illustrates the distribution of magnet arrays in helmet shell padding system, configured for expected impact force diffusion.

FIG. 10 shows a distribution of magnets in the helmet shell padding. In illustration 1001 the helmet shell 1004 is 8 mm (0.315 inch) thick, from exterior shell surface 1002 to inner shell surface 1003, and padding 1006 is 22 mm (0.87 inch) thick, to inner padding surface 1005. Magnet assembly 1008 is seen from the side, with its enclosure 1009.

Illustration 1010 shows the distribution of magnet assemblies on the inner padding surface 1005. Magnet assemblies 1008 are inside enclosures 1009. Each magnet array center, such as 1019, is in this embodiment 50.8 mm (2.0 inch) in distance 1021 from the nearest neighboring magnet array center, such as 1017.

1001 shows opponent helmet 1013 colliding with helmet shell 1014 at impact zone 1015. A collision of typical force has impact energy waves 1012 which disperse as they diffuse through shell 1004 and padding 1006, expanding about five times in radius from the impact zone on helmet outer surface 1002 to padding inside surface 1005, through an energy propagation cone, which at the padding inside surface 1005 impacts three or four magnetic assemblies, such as those seen in 1010 face view.

As an impact force propagates through the shell and foam, it expands as these structures absorb and displace it. This may be due to vibrational cascades spreading through foam cell walls, or from the displacement of gas inside foam cells to neighboring cells. Higher speed collisions will generate narrower energy propagation cones. Tangential collisions generate skewed energy propagation cones. The conic shape consequence result in multiple magnets or magnet assemblies in the exterior shell's padding being directly effected so that their distance to their nearest neighbor magnets on the internal body (not visible) is reduced, inducing outer magnet assemblies to repulse internal body magnet arrays. Helmet design will vary according to expected collisions. Parameters of magnet or magnet assembly distribution will vary so that multiple magnet or magnet assemblies shall be directly effected during expected collisions.

Preferably three or more magnet or magnet arrays will be directly effected in a typical, significant impact. In a preferred embodiment, five or more magnets or magnet arrays are directly effected in a 20 G impact. In this example a 20 G collision generates impact zone 1015, with a 12.7 mm (0.5 inch) radius and 506.71 $mm^2$ (0.79 $inch^2$) area at helmet surface 1002. The impact energy covers a 63.5 mm (2.5 inch) radius when it reaches 1005 inside surface, an area of 498.6 $mm^2$ (19.63 $inch^2$).

Figure 11:
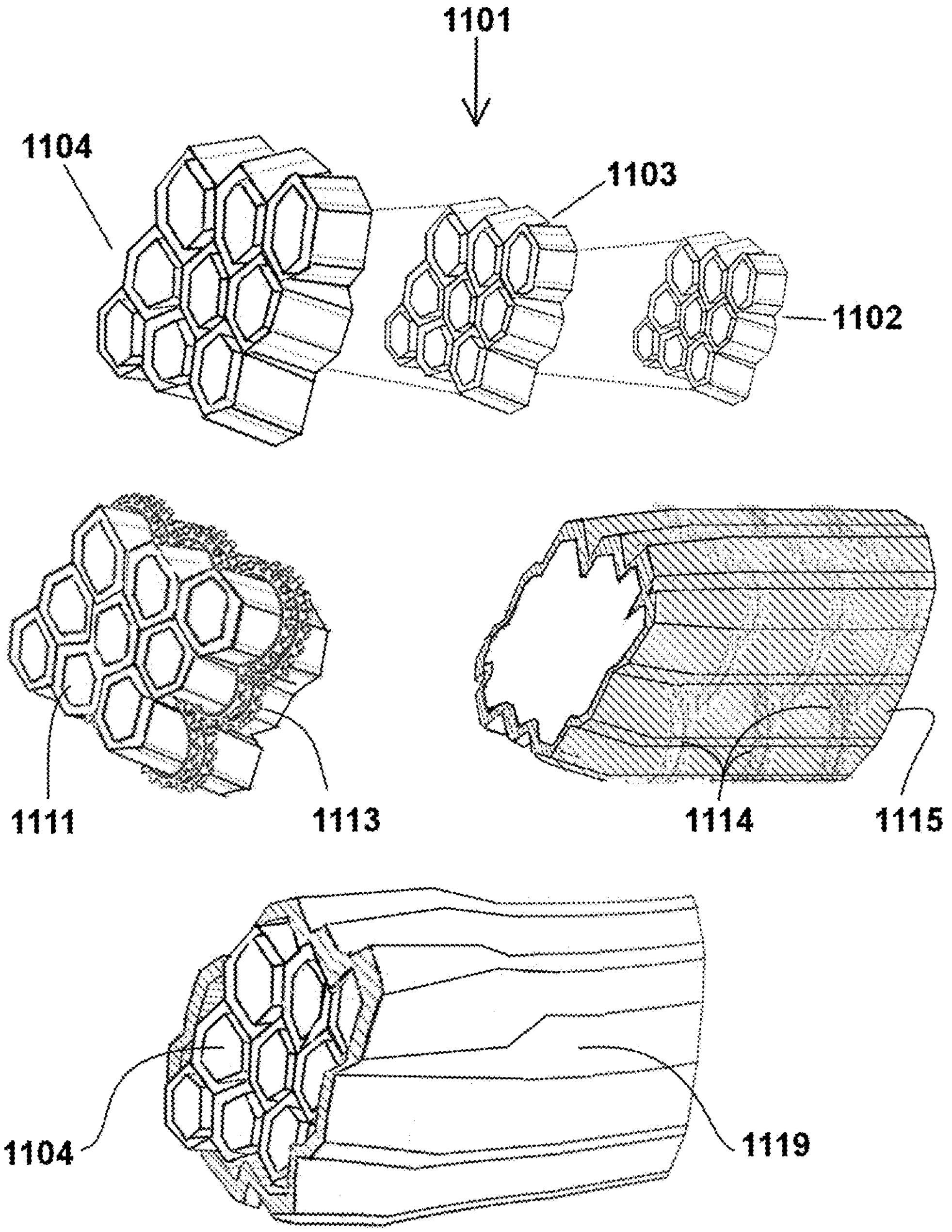
FIG. 11 illustrates a system to secure magnetic elements in an assembly.

FIG. 11 illustrates an embodiment of this invention, in which assembly is rendered less difficult by the use of magnet holders inserted into rings, with the assembly entirely contained by a surrounding sleeve.

The illustrated example is a three level pyramidal configuration 1101, with small 1102, medium 1103, and large 1104 magnet holders grouped in layers, each layer of magnet holders 1111 comprising nine magnets in nine holders that fit together. Each magnet holder layer 1111 is inserted in a ring holder 1113. Together they fit into a sleeve such as 1115, with slots 1114 that accommodate ring holders. This is repeated for all levels of the pyramid 1101, with ring holder slots 1114 placed accordingly.

The front-facing elements 1104 of pyramidal configuration 1101 are exposed in sleeve 1119.

Figure 12:
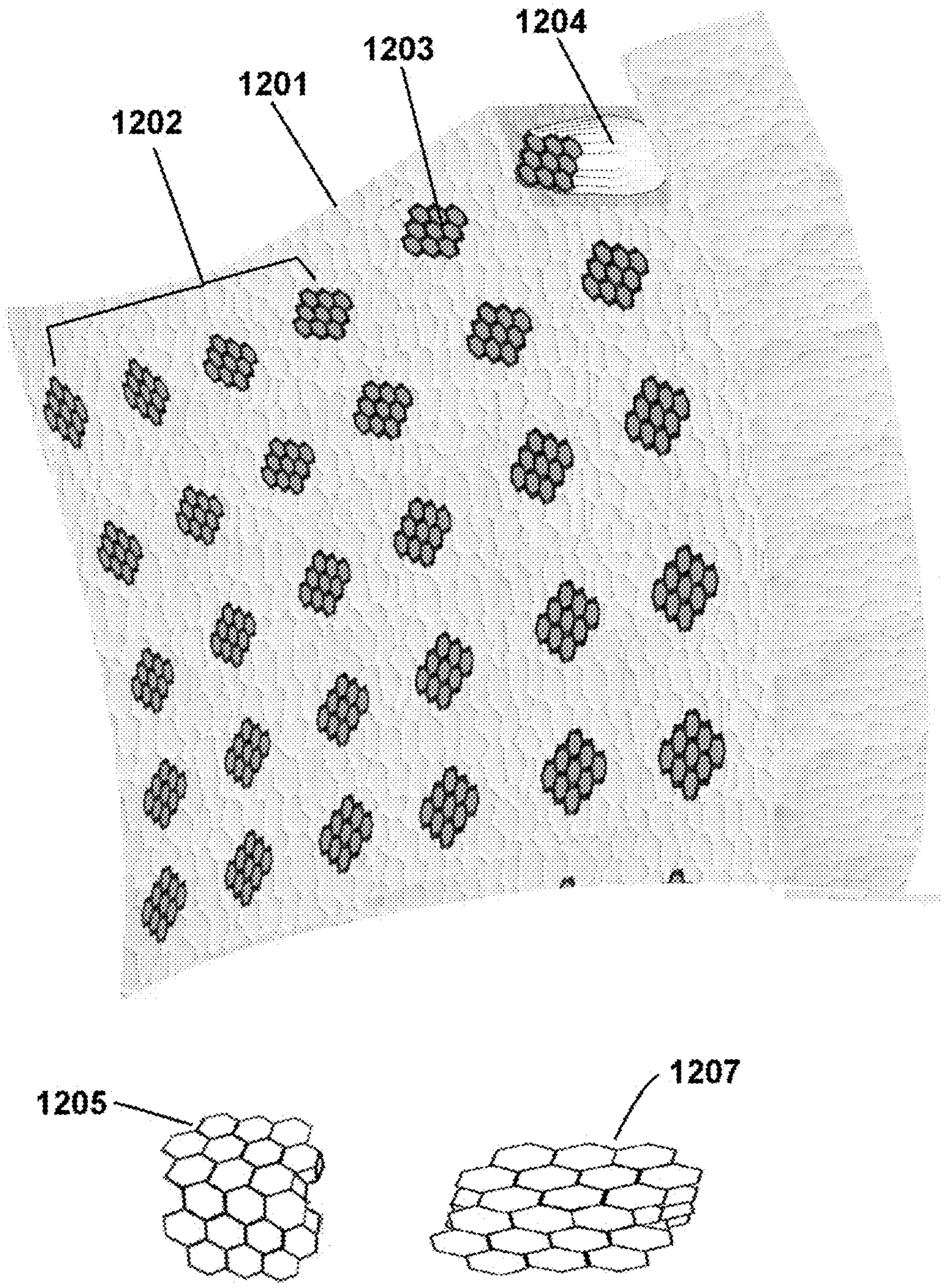
FIG. 12 shows a distribution of magnetic arrays configured in the exterior shell impact resistance padding.

FIG. 12 illustrates the helmet shell padding 1201 configured with magnet arrays 1202. This invention is ideally suited for auxetic foam padding, which expands non-uniformly in an optimal impact absorbing process, but only if such padding rebounds completely to its prior resting state, without deteriorating elasticity over time. The magnet configuration 1203 fits an auxetic cell pattern, and configuration 1203 may be adapted to compress in a way that conforms to the foam, by expansion of the magnet array containment system 1204.

Auxetic structures have a negative Poisson's ratio. When placed under stress, they become thicker perpendicular to the applied force. Cell pattern 1205 shows the resting state of an auxetic structure, and cell pattern 1207 shows the state under stress.

Figure 13:
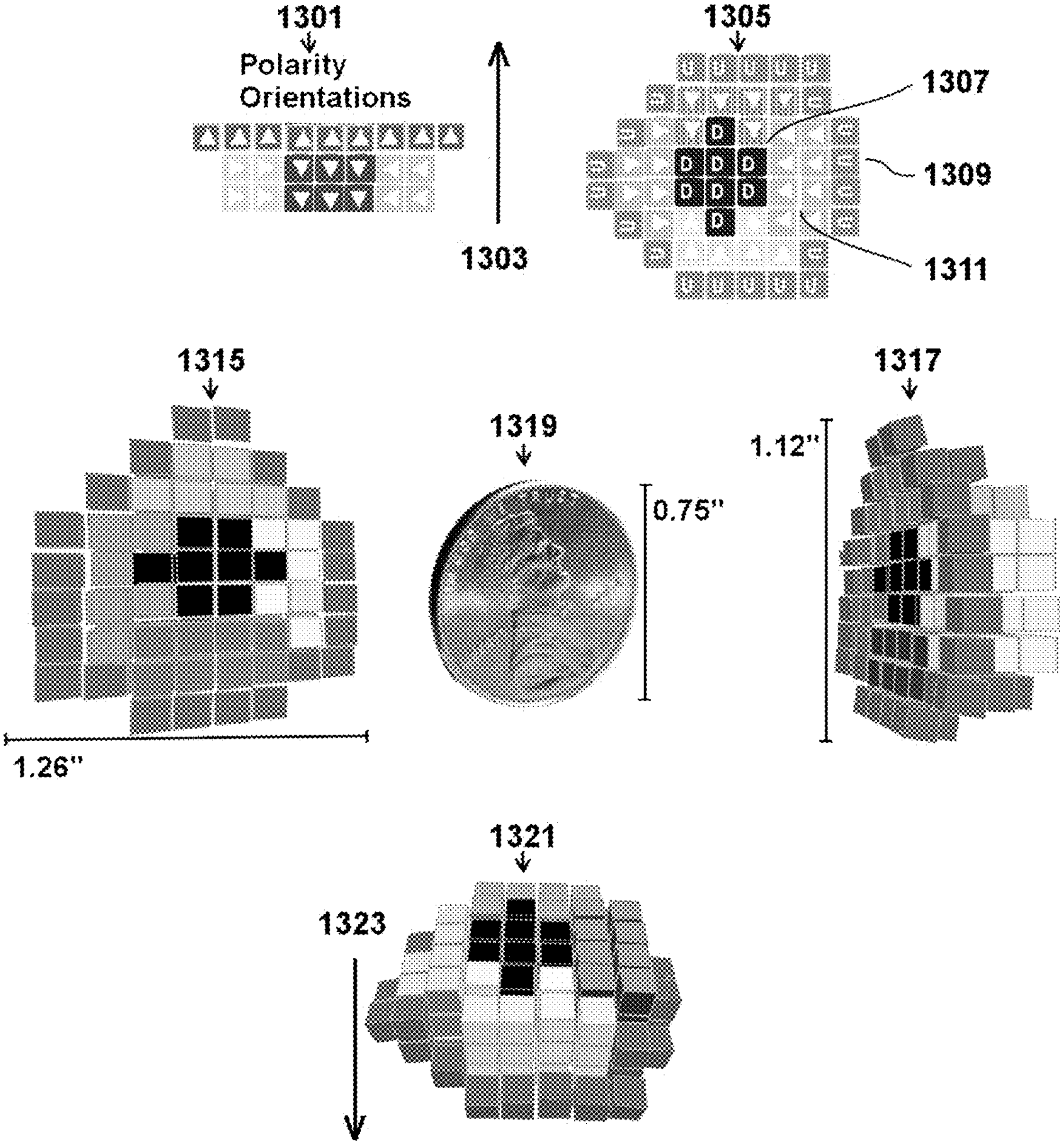
FIG. 13 illustrates a preferred embodiment for maximizing magnetic flux in one direction.

FIG. 13 illustrates the magnetic assembly for a padding element capable of being fitted against the inside surface of the exterior shell of the helmet. Small cuboid magnets have a polarity oriented in any of five directions. Seen from the side in 1301, four polarity orientations are arranged so that magnetic flux extends in the arrow 1303 direction only. Seen from above in 1305, the magnet arrangement has 1307 downward facing magnets in the center, 1309 upward facing magnets around the edges, and 1311 inward facing magnets with polarity in the four cardinal orientations.

1315 shows the inward facing magnet faces, with a measurement of their horizontal size. 1317 shows the same faces with a measurement of their vertical size. These sizes are compared to 1319 a US penny. This illustrates the small size of the assembly. 1321 shows the magnet assembly from the outward facing side (towards the helmet shell,) with an arrow 1323 pointing towards the interior of the helmet, where the magnetic field extends.

Figure 14A:
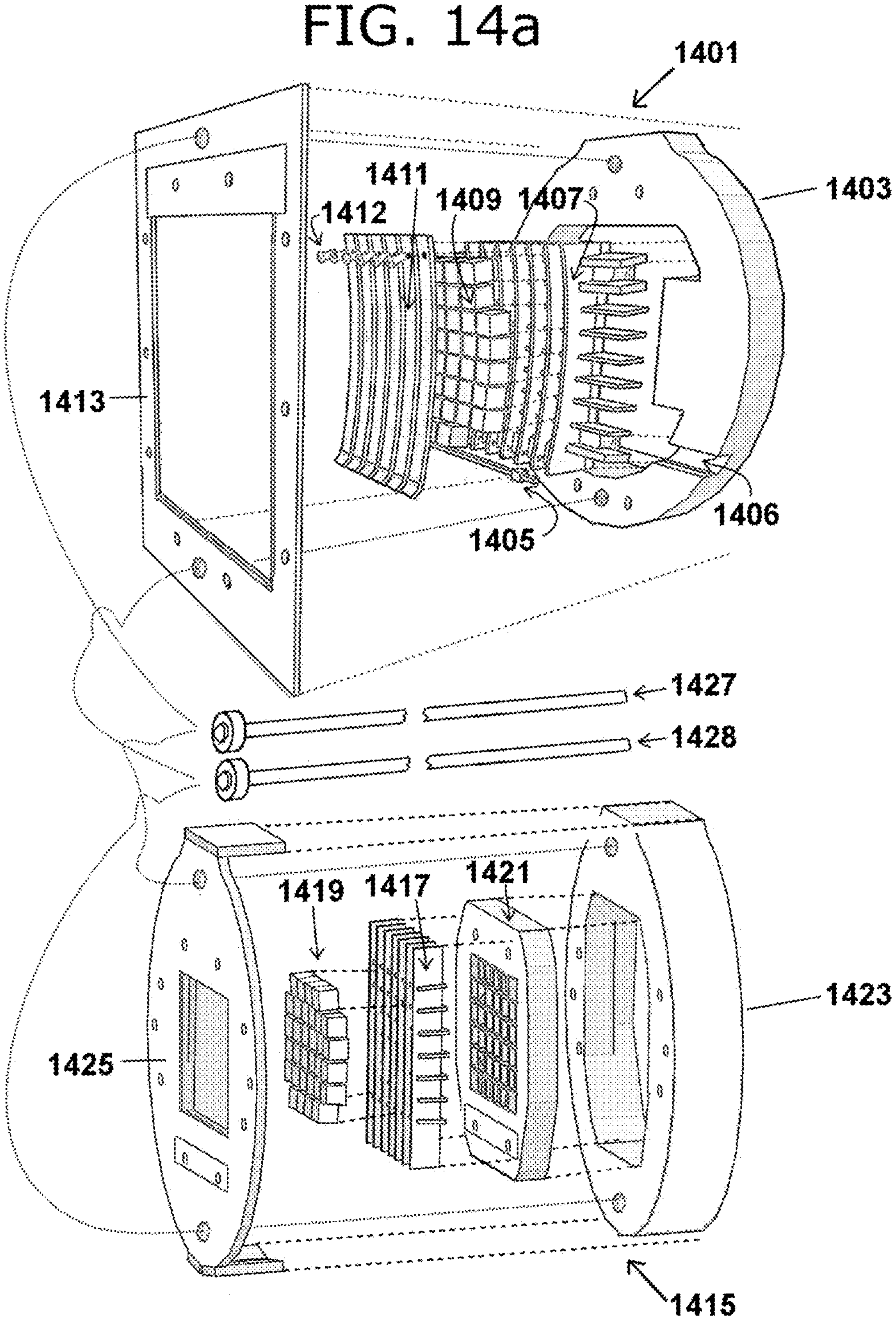
Figure 14C:
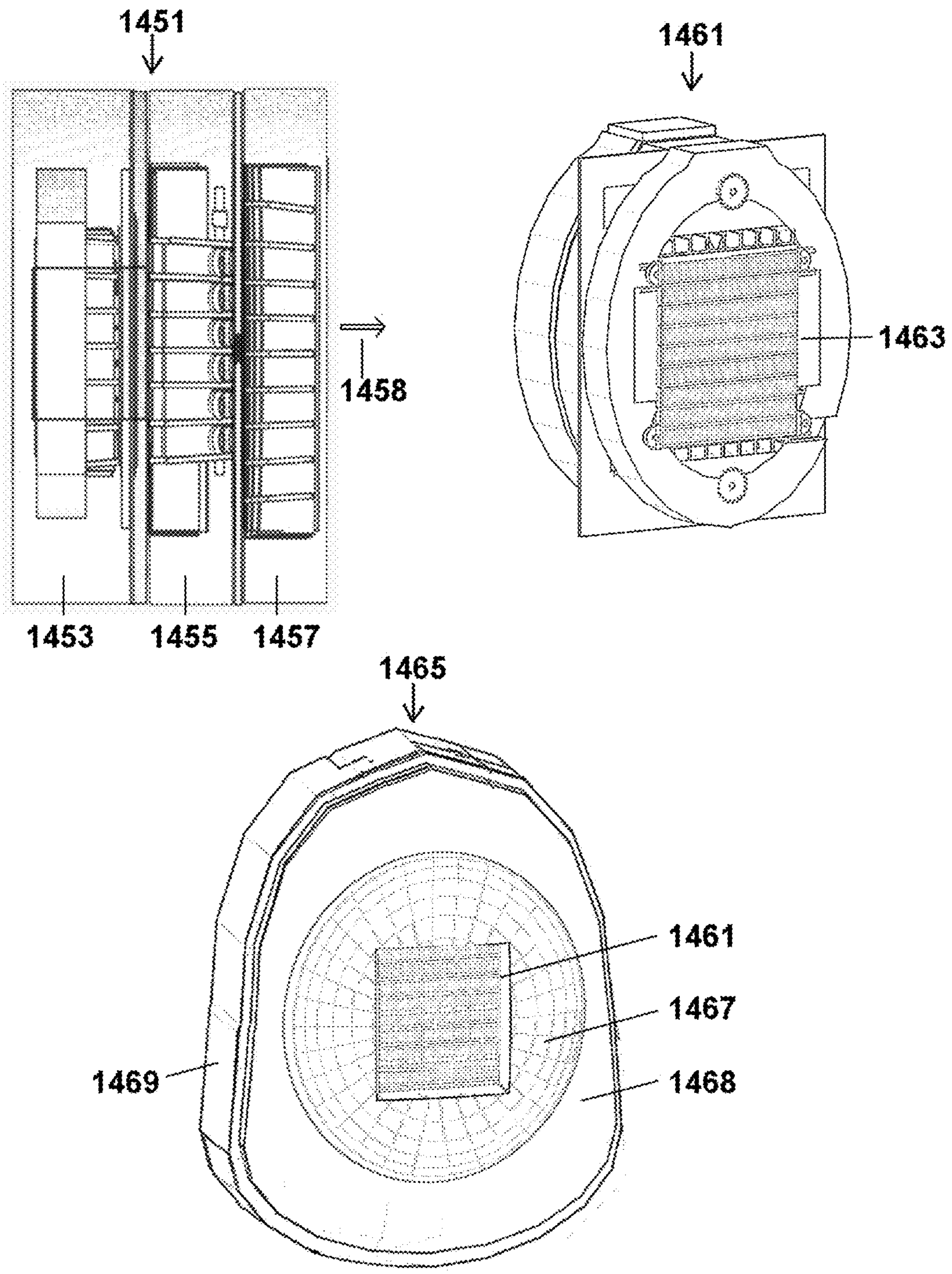

FIGS. 14A-C illustrate components of a pad attachable to the inner side of an exterior shell in a helmet. The pad contains a three layer magnet assembly that extends a magnet flux towards the interior of the helmet, embedded in protective apparatus that maintains magnet position and protects magnet structure. The magnet assembly is surrounded by cushioning material found to modify linear forces.

FIG. 14A shows two exploded drawings. 1401 is the middle layer of the three layer magnetic assembly situated in a pad. 1403 is the container, which has a series of horizontal shelves and dividers 1407 that keep the middle array of magnets 1409 separate from each other. Barriers 1411 cover the front of the magnets, protecting them, and locked in place by screws 1412. The middle magnet array, barriers, shelves, and dividers are held in place in container 1403 with sliding lock 1405, placed in canal 1406. Facing piece 1413 holds the middle layer in place.

1415 is the rear layer of the three layer magnetic assembly situated in a pad. 1417 is the framework holding the magnets 1419. 1421 shows the result of 1417 and 1419 combined.

1423 is the rear assembly container, and 1425 the front piece. Two long bolts 1427 and 1428 thread all three layers of the three layer magnetic assembly together, one on the bottom, the other on top.

FIG. 14B shows the front layer of a three layer magnet assembly. 1431 is an exploded view of the array combination composed of framework 1433, magnet assembly 1435, and front cover 1437. Note that magnets in array 1435 have polarity marks 1436 on each one. Screws 1439 hold cover 1437 in place on framework 1433. 1441 is a view of the front layer from the rear, showing how array combination 1432 fits into front container 1443.

In FIG. 14C, 1451 is a top-down view of the magnet arrangement of the three layer magnet assembly when put together. Rear layer 1453, middle layer 1455, and front layer 1457, combine to maximize magnetic flux in the direction of arrow 1458. The combined magnet assembly 1461 is illustrated with front facing protective barriers 1463 visible. Assembly 1461 is inserted in helmet pad 1465, along with cushioning 1467, padding 1468, and boundary fitting 1469.

Figure 14D:
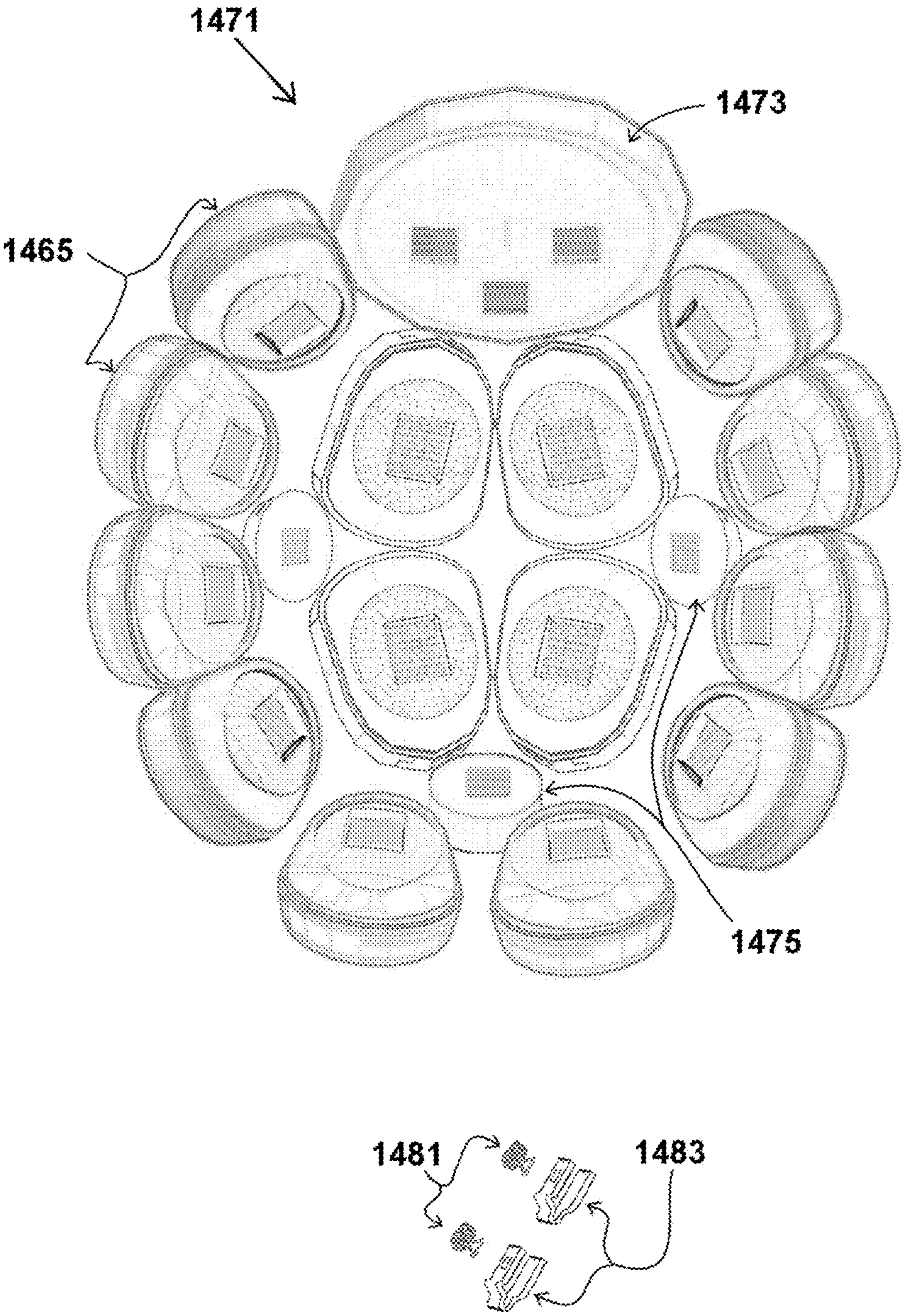
FIG. 14D illustrates the arrangement of magnetic field pads on a helmet interior.

FIG. 14D illustrates a configuration 1471 of magnet pads 1465, showing how they line the inside of a football helmet. One pad, 1473, combines several magnet assemblies. Some magnet pads, such as 1475, are scaled smaller. All the pads attach to the inner surface of the helmet. The inner helmet surface may be hard, smooth and otherwise as currently exist in athletic or military helmets. In an embodiment of a pad, guide fasteners on the pad 1481 aid in installing the pad onto the inner surface of the helmet shell. The helmet inner surface includes a body aperture or tab 1483 for receiving a fastener to attach the pad to the surface.

Figure 15A:
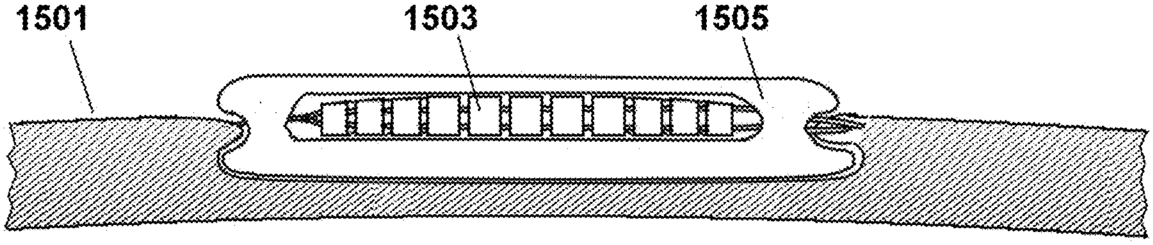
FIG. 15A shows a magnetic array embedded in an internal body.

FIG. 15A illustrates a portion of the internal body 1501 surrounding a person's head, which contains a magnet array 1503 with flux directed outwards. Magnet array 1503 is encased in protective unit 1505, which cushions impact force. Internal body 1501 is made from a flexible material that absorbs impact force. The entire internal body 1501 contains numerous magnet arrays such as 1503.

Figure 15B:
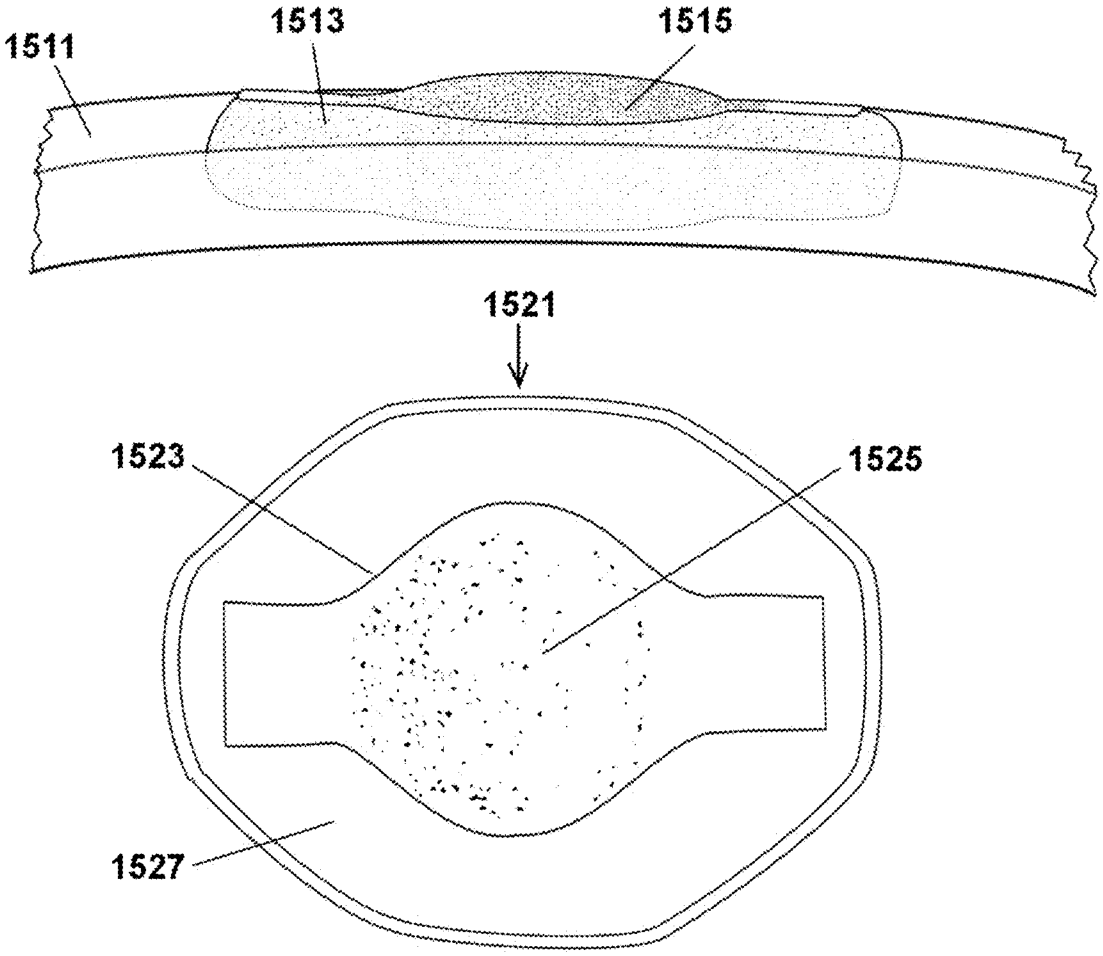
FIG. 15B shows the containment of magnetic smart fluids in an internal body and in a helmet interior pad.

FIG. 15B illustrates embodiments in which magnet material comprising smart fluids is employed. 1511 is part of the internal body surrounding a person's head, which contains magnet enclosure 1513 in which there is a ferrofluid, a ferromagnetic fluid, and/or a magnetorheological fluid, which are smart fluids 1515 substantively similar in form to a hydrogel.

1521 illustrates a pad attached to the exterior shell, with a magnetic flux directed inwards. Magnet enclosure 1523 contains a ferrofluid, a ferromagnetic fluid, and/or a magnetorheological fluid, smart fluids 1525 substantively similar in form to a hydrogel. Enclosure 1523 is surrounded by padding element 1527.

In some embodiments, Hall effects sensors, or other magnetic sensors, or other sensors that detect the movement of the helmet shell, may be deployed on the internal body. Because the internal body does not rotate with the exterior shell, but torques against that rotation, magnetic sensor recordings will measure accurate exterior shell motion. Methods like machine learning can be employed, to train on various helmet impacts, so that accurate interpretation of sensor readers can be processed in a controller. The controller will be programmed with helmet shell states and motions that are within ordinary ranges, and thresholds at which a significant percentage of users will suffer concussions.

Figure 16:
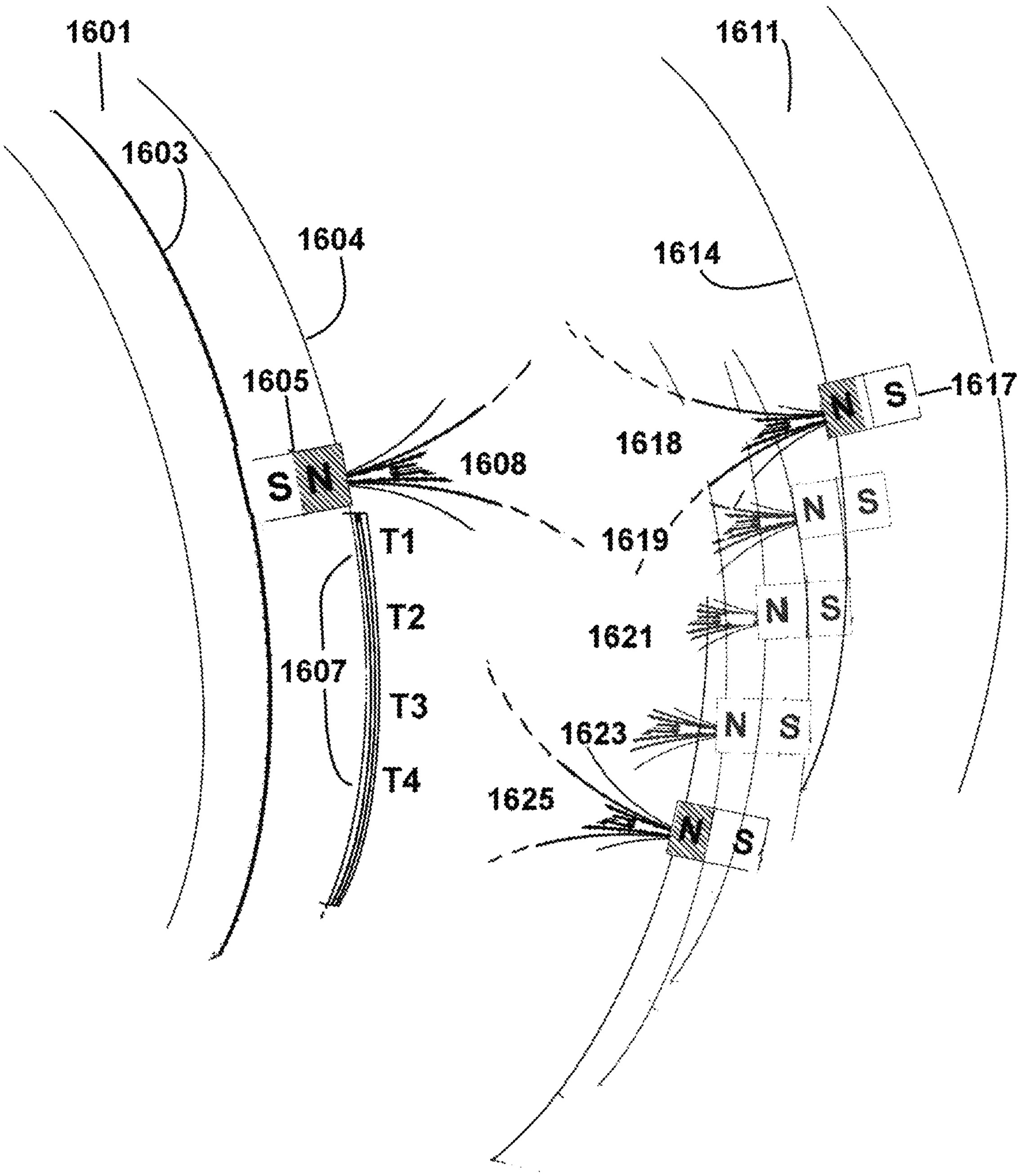
FIG. 16 illustrates the internal body torque response to the exterior shell rotational movement.

FIG. 16 illustrates a Hall effects sensor detection process. Internal body 1601 contains transmitting wire 1603 and a magnet 1605, it's north pole facing out of internal body surface 1604. A Hall effects sensor 1607 is located next the magnet. Exterior shell padding 1611 has magnet 1617 with north pole facing in from padding surface 1614. In position 1618 magnet 1617's field is sufficient distance from internal body magnet 1605's field 1608 that little interaction occurs.

After a tangential collision, exterior shell padding 1611 twists around. As it does so, magnet 1617's field moves across Hall effects sensor 1607. The magnetic field passes through four positions. At position 1619, the field is detected at sensor 1607 position T1. At position 1621 the field is detected at sensor 1607 position T2. 1623 is detected at T3, and 1625 at T4. This provides a controller with acceleration data.

Figure 17:
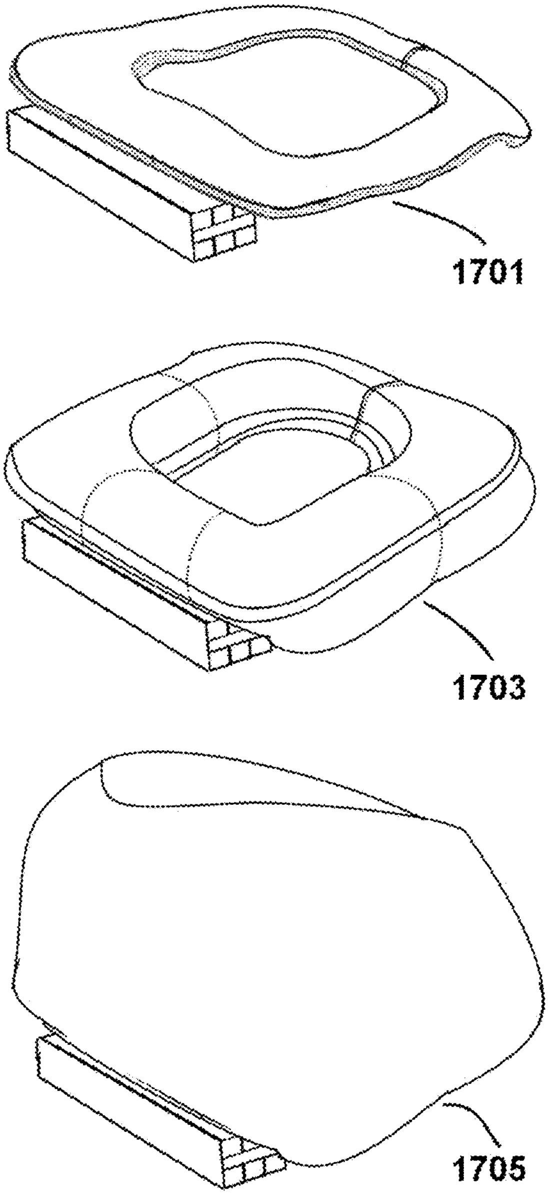
FIG. 17 illustrates the airbag components during inflation.

In the event that an incipient concussive acceleration is detected, the controller will trigger an airbag inflator located at the users neck, either at the base of a "hoodie" like sheath the player wears under the helmet, or in a neck "yoke" that sits on the top of shoulder pads. In FIG. 17 a "yoke" inflates, to rapidly encase the neck. 1701 shows the resting state of the airbag, uninflated. 1703 shows the beginning phase of inflation, and 1705 shows the filled airbag, prior to deflation. This fills the empty space in between a user and the helmet's elements, and prevents neck muscles from folding or otherwise failing to maintain the head stable. If a "hoodie" is used, a similar process occurs, with energy absorbing plastic material shielding the airbag against rupture or tearing so that it is reusable.

Collision impact involves the external object movement into a helmet area, and the internal head's movement into the same helmet area from within. Padding absorption and displacement of impact energy is perpendicular to the normal of these two movements. At the limit, the impact absorption and dispersal pattern is sandwiched in the padding. Beyond this padding fails, or "bottoms out." Padding cell structures no longer adapt, vibrate, and/or flex, and no longer contain gas to displace.

The dense padding of football helmet shells rarely, if ever, completely fail like this. Placement and cushioning of magnet arrays must be within the tolerance of foam and shell design. However, the internal body magnet arrays, which are closer to the head, must have magnet design and placement that prevents direct contact with the head. In some embodiments the "hoodie" airbag serves to protect the head in this situation.

The "hoodie" can protect the head against linear acceleration. If an internal body and exterior shell directly impinge on each other, inner and outer magnets may impinge, a threshold the controller detects to inflate the "hoodie". Complete helmet failure (the helmet breaking apart) is unlikely in American football, but not under conditions found in motorcycle accidents or battlefield explosions.

Figure 18:
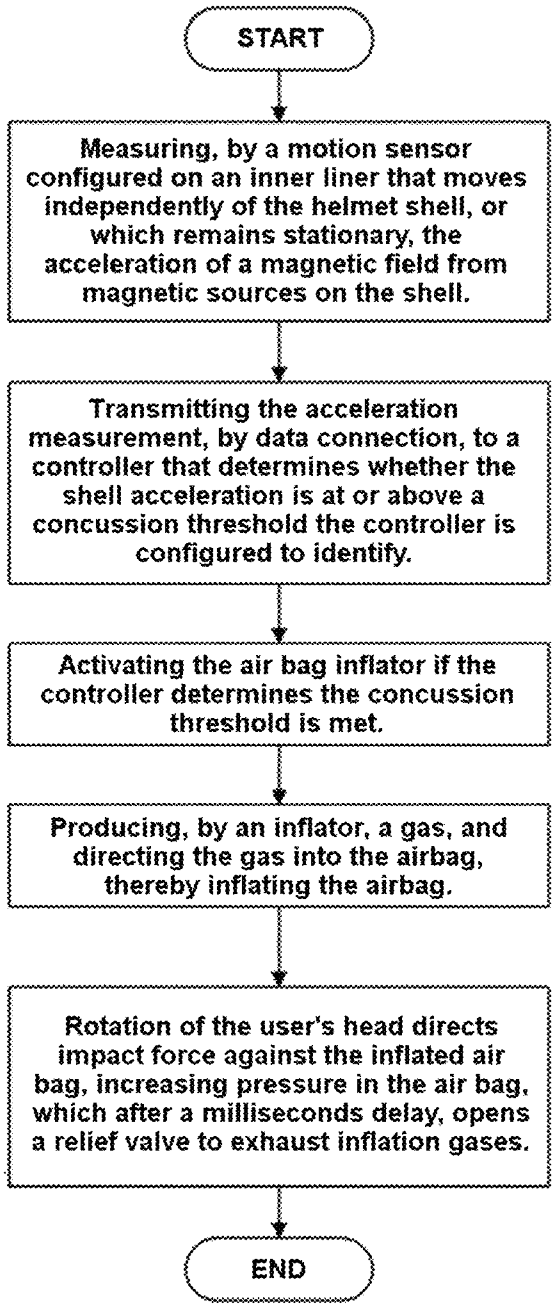
FIG. 18 is a flow-chart of the air bag deployment process.

FIG. 18 schematically depicts a flow chart which illustrates by way of example an operation of the "yoke" or "hoodie" airbag. The controller receives information concerning the helmet's exterior shell motion from sensors via a data connector. When impacts occur, the controller analyzes the measured motion, and detects if the measured motion surpasses thresholds. If it does, the controller activates the air bag inflator circuit. This occurs in 15 milliseconds or less, which is the current tolerance for side curtain air bag deployments in vehicles.

Figure 19A:
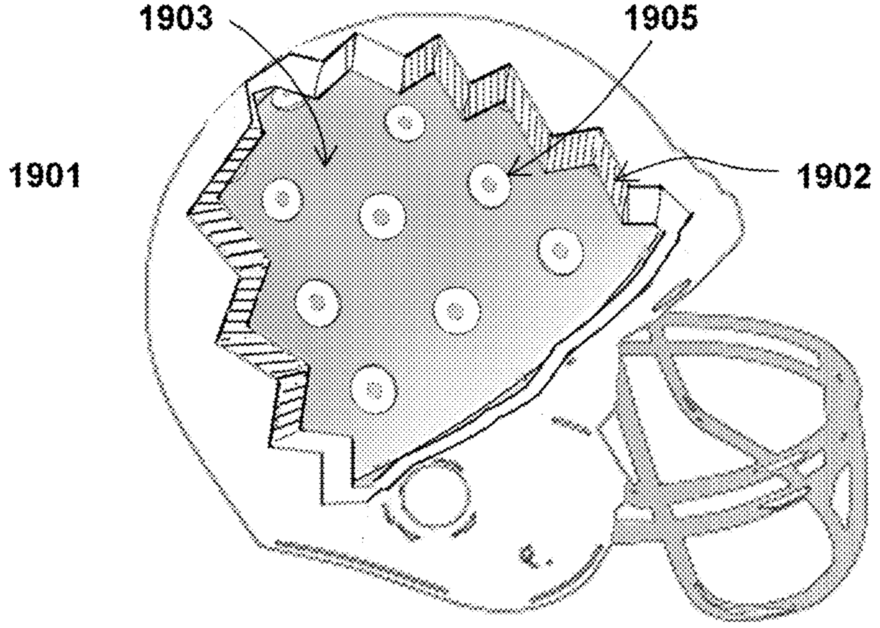
FIG. 19A shows the helmet shell with part of it cut away to reveal the magnet array on an internal body.
Figure 19B:
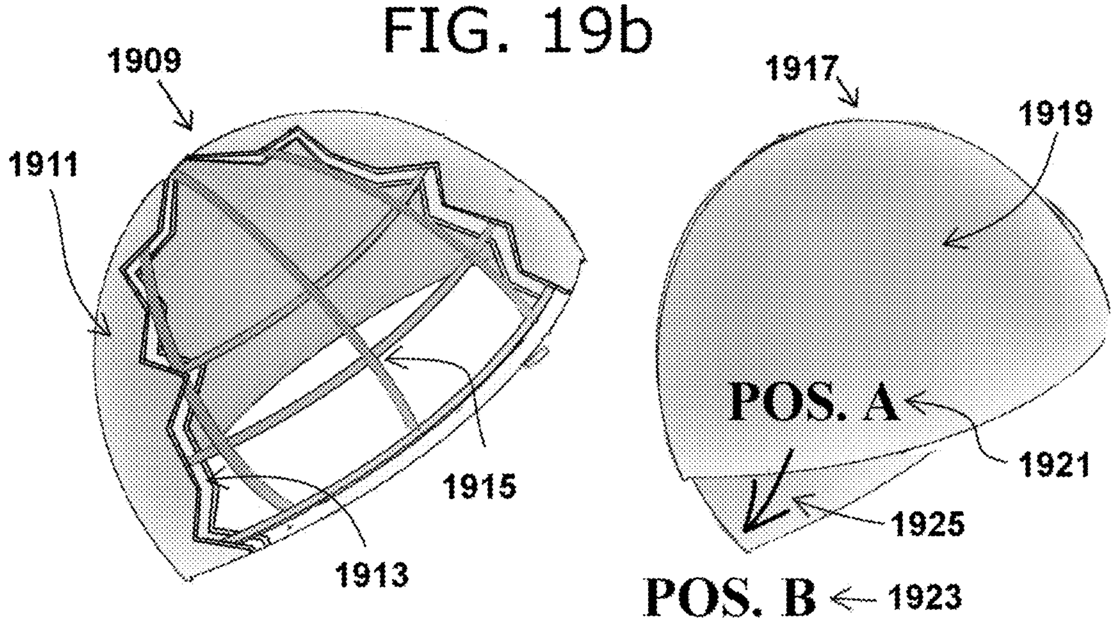
FIG. 19B shows the inner liner with part of it cut away to reveal an internal body support structure, and internal body motion on that structure.

FIG. 19A illustrates a helmet 1901 with the exterior shell partially cut away 1902, to reveal the internal body 1903 with magnetic sources 1905 distributed, magnetic flux directed outwards. FIG. 19B 1909 illustrates a wire structure structure inside the internal body. Inner shell 1911 is shown with section 1913 removed to reveal wire structure 1915 on which it floats. Another view, 1917, illustrates how internal body 1919 moves, in this example from POS. A 1921, to POS. B 1923, in the direction of arrow 1925. Obviously the direction and degree of internal body motion is subject to the exterior shell forces, and the entire movement of the invention part's render the internal body's motion entirely relative. The helmet's wearer may not experience any internal body movement, because this movement cancels the exterior shell's motion.

Figure 20:
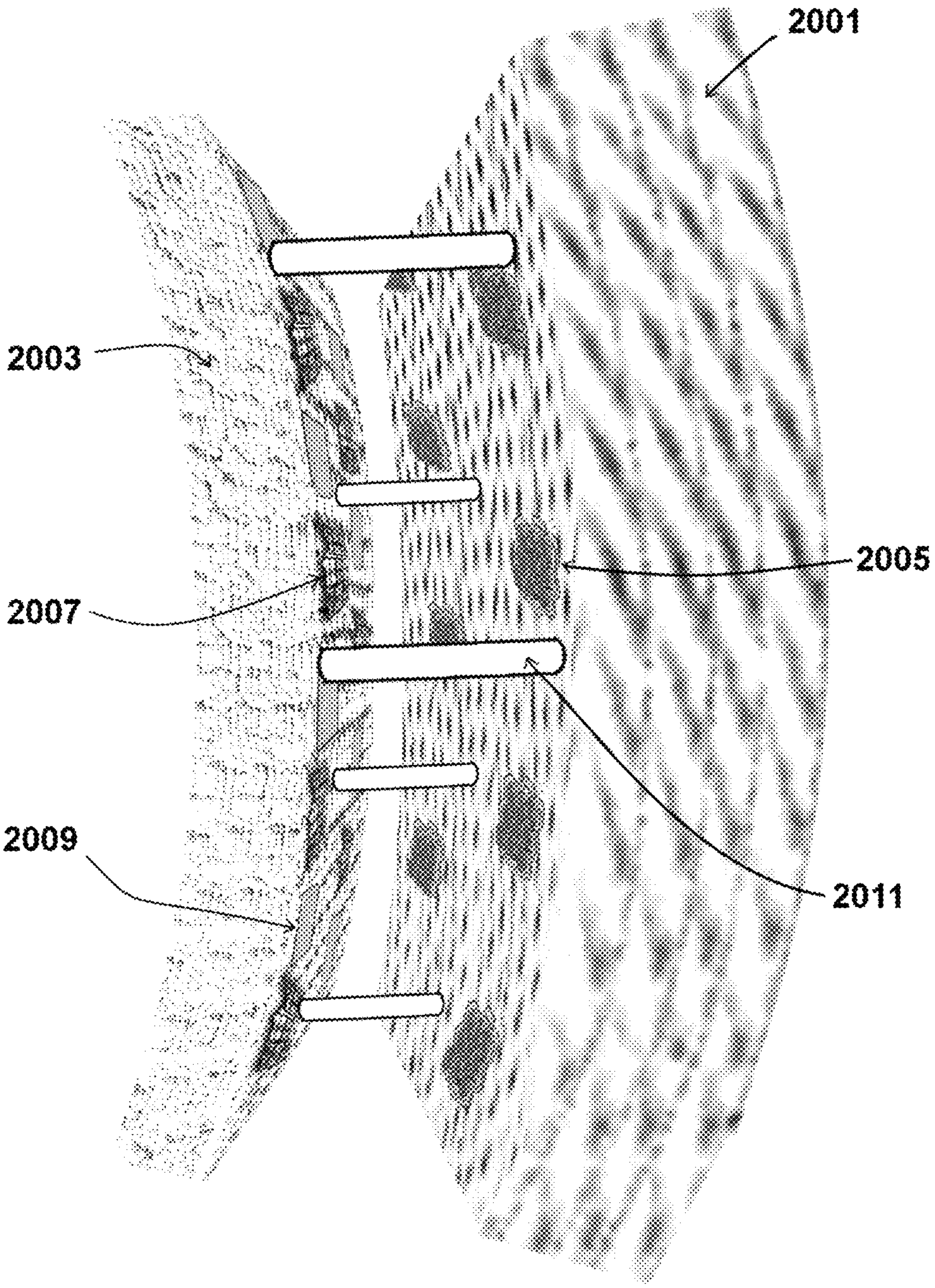
FIG. 20 illustrates the internal body padding and exterior shell padding with magnetic systems embedded.

FIG. 20 illustrates the exterior shell padding 2001 and internal body 2003 as they may be positioned inside a helmet. Padding 2001 has magnet assemblies 2005 embedded within. Internal body 2003 has magnet arrays 2007 embedded within. Each assembly 2005 is opposite an array 2007. On internal body 2003 inner surface, Hall effects sensors 2009 are also positioned. Spacer-orienters 2011 stretch between exterior shell padding 2001 and internal body 2003, to keep magnetic fields aligned and separated, while bending during rotational acceleration.

Figure 21A:
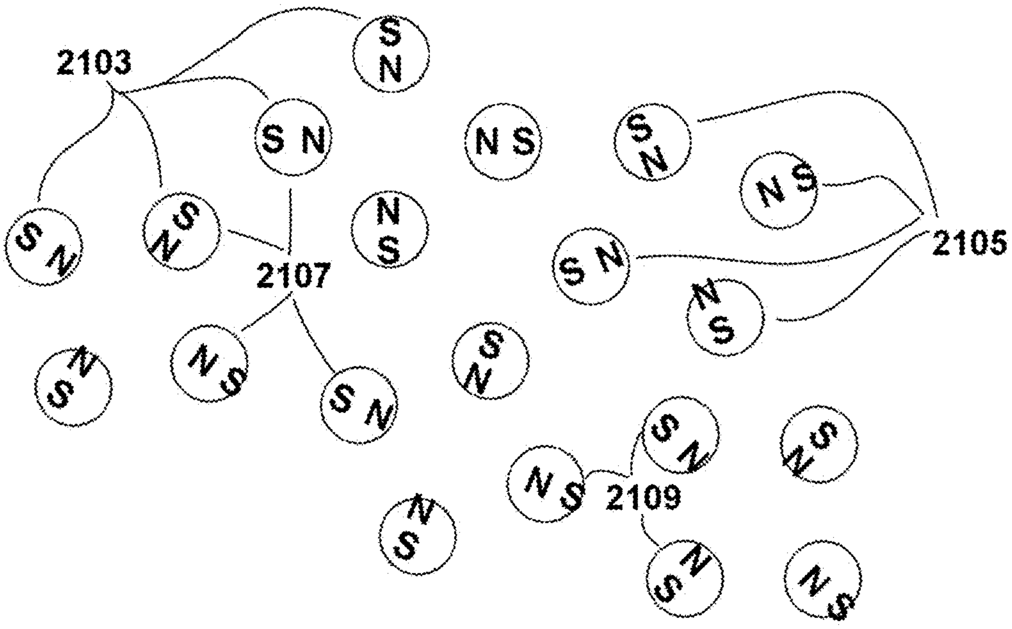
FIG. 21A illustrates the position of flexible projections containing magnets in a column.

FIG. 21A illustrates a top-down or bottom-up view of many flexible projections 2103, which are spacer-orienters wide enough to contain small magnets arranged in a single column. These magnets are attached to walls of the flexible projections, and are close enough to duplicate the magnet flux of a single long magnet with magnetic polarity across the width of the column. The flexible projections 2103 are arrayed to maximize repulsive magnetic fields during exterior shell rotations. A variety of topological algorithms can be used to array flexible projections 2103 for this purpose.

FIG. 21A is a multigraph with multiple edges. A multigraph may have edges that have the same end nodes. An edge is defined by the two nodes it connects. In this embodiment, the nodes are identified by polarity, and the edge is defined as a magnetic force field.

A multigraph that generates FIG. 21A is composed of ordered pairs of columns, defined as C=(P, F), where P is a set of polarities, and F is a multiset of pairs of magnetic fields. Because exterior shell movement moves many flexible projections, this is a directed multigraph, which is defined in the same way as a mixed graph, C=(P, F, A). The oriented magnetic fields have arrows A between them.

The multigraph is a directed graph with pairs of directed edges connecting flexible projections to show the force fields that increase between them, during exterior shell motion. In FIG. 21A four flexible projections 2103 form the primary level of ordered pairs, multiset $F_x$ 2105. A secondary level of ordered pairs 2107 connects four flexible projections from three primary level multisets like $F_x$ 2105. Another secondary level of three ordered pairs 2109 connects three primary level multisets as well. This hierarchy is one approach to optimize the multidimensional distance between polarities to generate repulsive magnetic fields during exterior shell rotation.

Figure 21B:
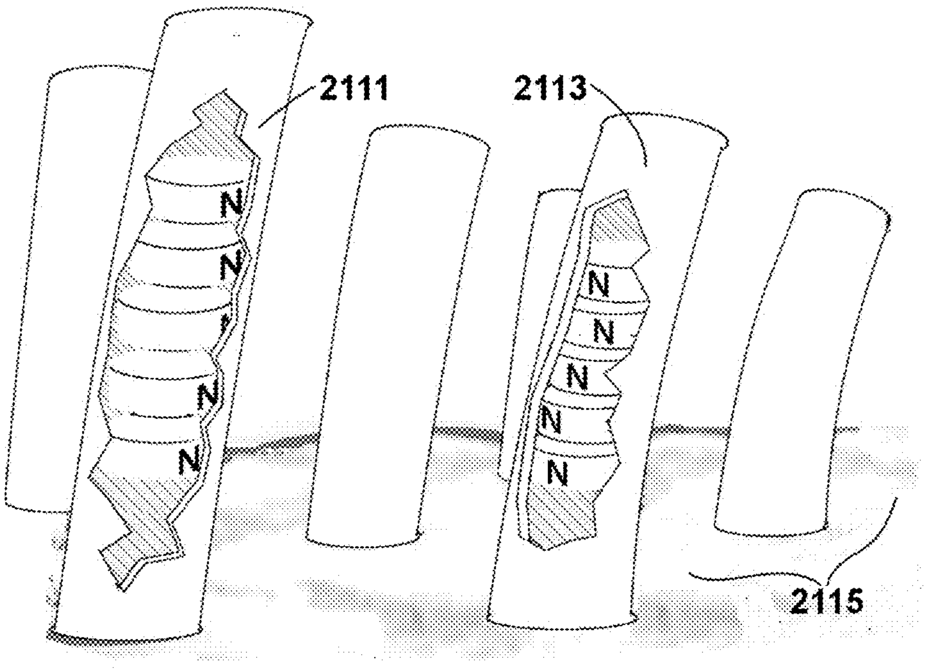
FIG. 21B shows how flexible projections are oriented to maximize repulsive magnetic fields.

FIG. 21B illustrates the position of flexible projections containing magnets in a column. FIG. 21B shows how flexible projections are oriented to maximize repulsive magnetic fields. When the exterior shell moves, it may force a flexible projection such as 2111 towards another such as 2113. The increase in magnetic repulsive force between them dampens the transmission of movement to the internal body, 2115.

Figure 22:
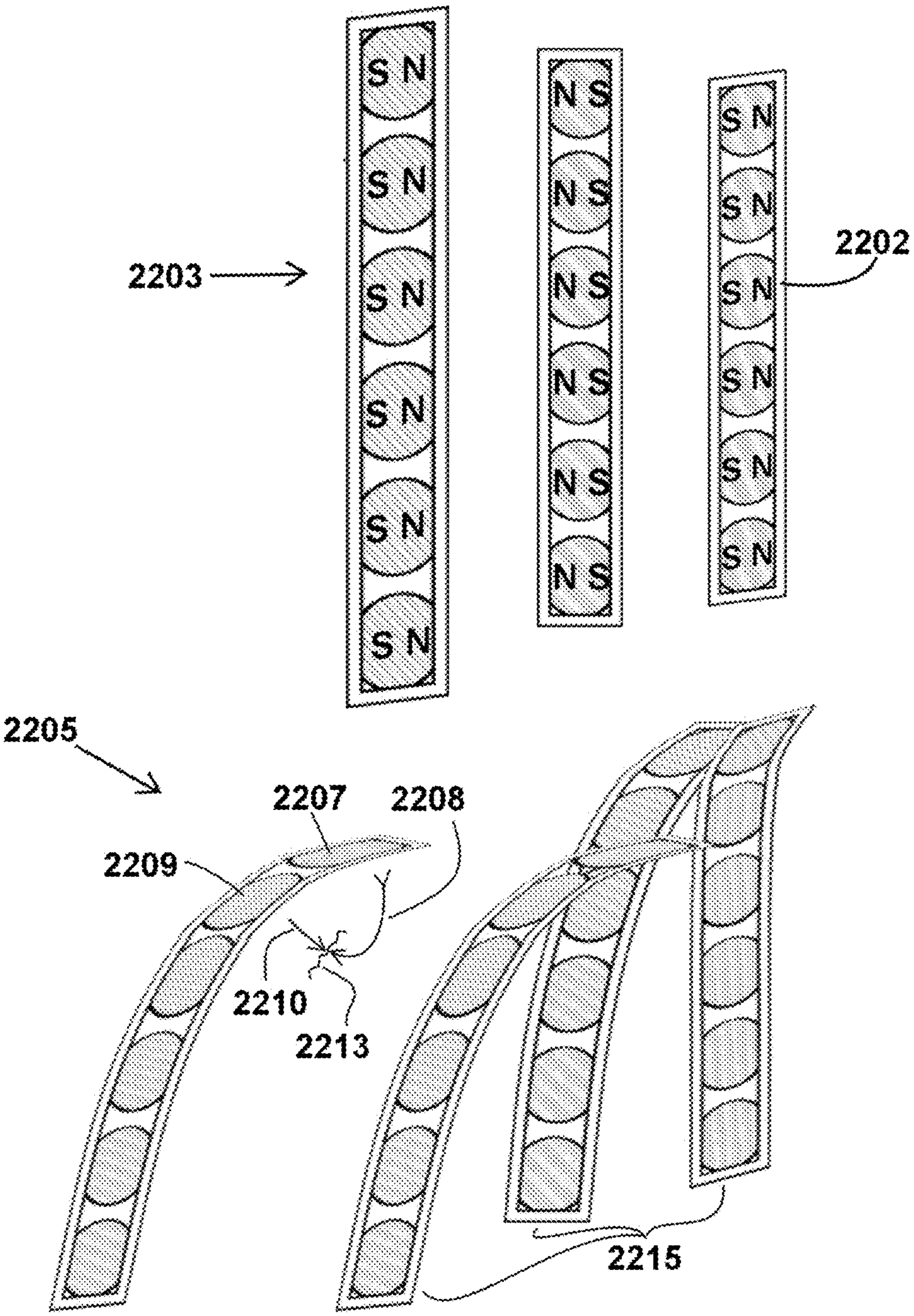
FIG. 22 illustrates the arrangement of flexible projections containing spheroid magnets in a column, oriented to maximize repulsive magnetic fields.

FIG. 22 is a diagrammatic drawing of flexible projections containing spheroid magnets in a column. 2203 shows thee flexible projections in a resting condition. The spheroid magnets are retained in position by attachment to column walls 2202. The spheroid shape causes a flexible projection to generate a repulsive magnetic field with itself when it bends, shown as 2205. The top magnet 2207 extends a flux along 2208 which generates a magnetic repulsion field 2213 with the flux 2210 from magnet 2209. This causes resistance to further bending. There is also a repulsive magnetic field generated between the three flexible projections 2215. Other columnar configurations of magnets can be employed, such as spheroids oriented with polarities facing vertically, so that neighboring pairs of magnets generate a repulsive field, dampening linear acceleration forces.

FIG. 23 illustrates the collision forces generated between two football players.

The invention may further provide other features of head-mounted devices as described in co-pending U.S. patent application Ser. No. 16/689,086, entitled "ROTATION DAMPING HELMET", filed on Nov. 20, 2019, which is incorporated by reference herein in its entirety.

What is claimed is:

1. A method of reducing a transmission of a tangential acceleration from a helmet shell to a person's head, comprising an internal body positionable about the person's head, and the helmet shell cooperatively rotatable with respect to the internal body, the internal body configured with at least one magnetic flux facing outward, and the helmet shell configured with at least one magnetic flux facing inward, to produce a damping torque in the internal body in the transmission of the tangential acceleration, the method comprising the steps of:

a) starting in a resting state, forming at least one repulsive magnetic field in a space configured by an axial alignment of the at least one magnetic flux of the internal body and the at least one magnetic flux of the helmet shell;

b) upon receiving a force that causes the tangential acceleration of the helmet shell during a period T, comprising a first period Ta, and a second period Tb;

i) during Ta, the at least one repulsive magnetic field increases magnetic strength and rotates as the helmet shell moves in a tangential direction with respect to the internal body, causing a plurality of linkages between the helmet shell and the internal body to bend;

ii) during Tb, the at least one magnetic field produces the damping torque in the internal body;

c) reducing the transmission of the tangential acceleration from the helmet shell to the person's head;

d) returning to the resting state, as the plurality of linkages straighten.

2. The method of claim 1, wherein step (b) (ii) further comprises:

the at least one magnetic field produces a torque that dissipates the force that causes the tangential acceleration of the helmet shell.

3. The method of claim 1, wherein the step of receiving a force further comprises:

occurring simultaneously the first period Ta and the second period Tb.

4. The method of claim 1, wherein the step of starting in a resting state further configures the axial alignment of the internal body magnetic flux and the helmet shell magnetic flux with an adequate distance between them to prevent magnetic interaction.

5. The method of claim 1, wherein the step of reducing the transmission of the tangential acceleration further includes:

the internal body slipping easily on the person's head.

6. The method of claim 2, wherein the step of the at least one magnetic field produces a torque that dissipates the force includes:

decelerating rotation of the helmet shell.

7. A method for providing a magnetic field internally contained between a helmet shell and a head cover, the magnetic field forming between an aligned dipoles of at least one magnet on the helmet shell and at least one magnet on the head cover when the helmet shell is in a quiescent state, the magnetic field rotating when a force vector in a tangential direction is applied to the helmet shell, the magnetic field producing a torque in the head cover in an inverse tangential direction, the method comprising the steps of:

radially offsetting the helmet shell dipole from the head cover dipole in the tangential direction;

approaching the helmet shell closer to the head cover;

producing the torque in the head cover in the inverse tangential direction to the tangential direction of the force vector;

returning the helmet shell to the quiescent state wherein the magnetic field is formed between the aligned dipoles.

8. The method of claim 7, wherein the step of returning the helmet shell to the quiescent state includes:

a periodic updating of the quiescent state magnetic field to correspond to a substantially exact alignment of the aligned dipoles.

* * * * *